United States Patent
Kobayashi et al.

(10) Patent No.: US 11,568,300 B2
(45) Date of Patent: Jan. 31, 2023

(54) APPARATUS AND METHOD FOR MANAGING MACHINE LEARNING WITH PLURALITY OF LEARNING ALGORITHMS AND PLURALITY OF TRAINING DATASET SIZES

(71) Applicant: FUJITSU LIMITED, Kawasaki (JP)

(72) Inventors: Kenichi Kobayashi, Kawasaki (JP); Akira Ura, Yokohama (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 1492 days.

(21) Appl. No.: 15/639,593

(22) Filed: Jun. 30, 2017

(65) Prior Publication Data

US 2018/0018586 A1 Jan. 18, 2018

(30) Foreign Application Priority Data

Jul. 13, 2016 (JP) .............................. JP2016-138672

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ........ G06N 20/00; G06N 5/025; G06N 7/005; G06K 9/6256; G06K 9/6269
(Continued)

(56) References Cited

U.S. PATENT DOCUMENTS 7,849,032 B1 * 12/2010 Campos .................. G06N 3/08 706/25
2005/0125434 A1 * 6/2005 Fan ........................ G06N 20/20
(Continued)

FOREIGN PATENT DOCUMENTS

JP 2013-182621 9/2013
JP 2014-071493 4/2014
WO 2011-052025 5/2011

OTHER PUBLICATIONS

Gupta et al.—"Model Accuracy and Runtime Tradeoff in Distributed Deep Learning"—2015—https://arxiv.org/abs/1509.04210v2 (Year: 2015).*

(Continued)

*Primary Examiner* — Viker A Lamardo
(74) *Attorney, Agent, or Firm* — Fujitsu Patent Center

(57) ABSTRACT

A machine learning management apparatus identifies a maximum prediction performance score amongst a plurality of prediction performance scores corresponding to a plurality of models generated by executing each of a plurality of machine learning algorithms. As for a first machine learning algorithm having generated a model corresponding to the maximum prediction performance score, the machine learning management apparatus determines a first training dataset size to be used when the first machine learning algorithm is executed next time based on the maximum prediction performance score, first estimated prediction performance scores, and first estimated runtimes. As for a second machine learning algorithm different from the first machine learning algorithm, the machine learning management apparatus determines a second training dataset size to be used when the second machine learning algorithm is executed next time based on the maximum prediction performance score, second estimated prediction performance scores, and second estimated runtimes.

6 Claims, 20 Drawing Sheets

(58) Field of Classification Search
USPC .......................................................... 706/12
See application file for complete search history.

(56) References Cited

U.S. PATENT DOCUMENTS

| 2006/0074823 A1* | 4/2006 | Heumann | G06N 20/00 |
| | | | 706/16 |
| 2006/0074826 A1* | 4/2006 | Heumann | G06K 9/6217 |
| | | | 706/20 |
| 2006/0074827 A1* | 4/2006 | Heumann | G06K 9/6217 |
| | | | 706/20 |
| 2006/0074828 A1* | 4/2006 | Heumann | G06K 9/6217 |
| | | | 706/20 |
| 2013/0223727 A1 | 8/2013 | Jiang et al. | |
| 2015/0199364 A1 | 7/2015 | Nishi et al. | |

OTHER PUBLICATIONS

Beleites et al.—"Sample size planning for classification models"—2012—https://arxiv.org/abs/1509.04210v2 (Year: 2012).*

Wilson et al.—"The general inefficiency of batch training for gradient"—2003—https://www.sciencedirect.com/science/article/pii/S0893608003001382 (Year: 2003).*

Azimi et al.—"Hybrid Batch Bayesian Optimization"—2012—https://arxiv.org/abs/1202.5597 (Year: 2012).*

Li et al.—"Efficient mini-batch training for stochastic optimization"—2014—https://dl.acm.org/doi/10.1145/2623330.2623612 (Year: 2014).*

Konecný et al.—"Mini-Batch Semi-Stochastic Gradient Descent in the Proximal Setting"—2015—https://arxiv.org/abs/1504.04407 (Year: 2015).*

Foster Provost et al., "Efficient Progressive Sampling", Proceedings of the Fifth International Conference on Knowledge Discovery and Data Mining (KDD-99), Aug. 1999, pp. 23-32 (10 pages).

George H. John et al., "Static Versus Dynamic Sampling for Data Mining", Proceedings of the Second International Conference on Knowledge Discovery and Data Mining (KDD-96), Aug. 1996, pp. 367-370 (4 pages).

Christopher Meek et al., "The Learning-Curve Sampling Method Applied to Model-Based Clustering", Journal of Machine Learning Research, vol. 2, Feb. 2002, pp. 397-418 (22 pages).

Prasanth Kolachina et al., "Prediction of Learning Curves in Machine Translation", Proceedings of the 50th Annual Meeting of the Association for Computational Linguistics, Jul. 2012, pp. 22-30 (9 pages).

* cited by examiner

MACHINE LEARNING PROGRESS SCREEN

| STEP NUMBER | ALGORITHM | SAMPLE SIZE | ACHIEVED PREDICTION PERFORMANCE |
|---|---|---|---|
| ⋮ | ⋮ | ⋮ | ⋮ |
| 4 | $a_2$ | 2000 | 0.75 |
| 5 | $a_1$ | 4000 | 0.75 |
| 6 | $a_2$ | 12000 | 0.80 |

FIG. 13

MANAGEMENT TABLE STORING UNIT 122

HISTORY TABLE 124

| ALGORITHM ID | SAMPLE SIZE | PREDICTION PERFORMANCE | RUNTIME |
|---|---|---|---|
| $a_1$ | 1000 | 0.70 | 3 SEC |
| $a_2$ | 1000 | 0.71 | 10 SEC |
| ⋮ | ⋮ | ⋮ | ⋮ |

FUNCTION TABLE 125

| ALGORITHM ID | PREDICTION PERFORMANCE FUNCTION | PROBABILITY DISTRIBUTION FUNCTION | RUNTIME FUNCTION |
|---|---|---|---|
| $a_1$ | $a_1.fp()$ | $a_1.fXp()$ | $a_1.ft()$ |
| $a_2$ | $a_2.fp()$ | $a_2.fXp()$ | $a_2.ft()$ |
| ⋮ | ⋮ | ⋮ | ⋮ |
| $a_n$ | $a_n.fp()$ | $a_n.fXp()$ | $a_n.ft()$ |

SCHEDULE TABLE 126

| ALGORITHM ID | SAMPLE SIZE | IMPROVEMENT RATE |
|---|---|---|
| $a_1$ | 1000 | ∞ |
| $a_2$ | 1000 | ∞ |
| ⋮ | ⋮ | ⋮ |
| $a_n$ | 1000 | ∞ |

FIG. 15

APPARATUS AND METHOD FOR MANAGING MACHINE LEARNING WITH PLURALITY OF LEARNING ALGORITHMS AND PLURALITY OF TRAINING DATASET SIZES

CROSS-REFERENCE TO RELATED APPLICATION

This application is based upon and claims the benefit of priority of the prior Japanese Patent Application No. 2016-138672, filed on Jul. 13, 2016, the entire contents of which are incorporated herein by reference.

FIELD

The embodiments discussed herein are related to an apparatus and method for managing machine learning.

BACKGROUND

Machine learning is sometimes used as a data analysis tool using a computer. In the machine learning, a training dataset representing some known instances is input to the computer. The computer analyzes the training dataset to thereby learn a model that generalizes the relationship between cause (sometimes referred to as an explanatory or independent variable or variables) and effect (sometimes referred to as a target or dependent variable). The use of the learned model allows predictions of the outcomes of unknown instances. For example, a model for predicting the risk of developing disease for a given person is learnable from a training dataset obtained through research on lifestyle habits of a plurality of people and the presence or absence of disease in them. In addition, a model for predicting the demand for a future product or service is learnable from a training dataset on demands for products and services in the past.

As for the machine learning, it is preferable that the learned model achieves high accuracy, that is, has a high ability to predict the outcomes of unknown instances with accuracy (hereinafter referred to also as "prediction performance"). A larger size of the training dataset in the learning delivers higher prediction performance. On the other hand, a larger size of the training dataset entails longer model learning time. In view of this, progressive sampling has been proposed as a technique that efficiently constructs a model with practically sufficient prediction performance.

In the progressive sampling, a computer first learns a model using a small-sized training dataset. Using a testing dataset representing known instances, which is different from the training dataset, the computer compares results predicted by the model to known outcomes to thereby evaluate the prediction performance of the learned model. If the prediction performance is not sufficient, the computer learns again a model using a larger-sized training dataset than the previous attempt. By repeating this procedure until sufficient prediction performance is obtained, it is possible to prevent the use of an excessively large-sized training dataset, which results in shortening the model learning time.

Note that there is provided a data processing apparatus for generating classification rules used to classify documents into a plurality of categories by means of machine learning. The proposed data processing apparatus learns characteristics of each category using part of sample documents classified in advance into the categories. In this regard, the data processing apparatus selects the partial sample documents for machine learning in such a manner that the total number of selected sample documents does not exceed a predetermined upper limit and the number of sample documents selected varies less from category to category.

There is also provided a learning method for learning a boundary separating data belonging to a category from data not belonging to the category. The proposed learning method includes the following steps: adding, after learning the boundary one time using a set of samples, unlabeled samples (i.e., samples that are not labeled whether they belong to the category) to the set of samples; selecting, based on support vectors that are points lying on the boundary, new support vectors amongst the added unlabeled samples; and replacing some of the existing support vectors with the new support vectors.

There is also provided a data analysis apparatus for processing original data and using the processed original data as a training dataset for machine learning. The proposed data analysis apparatus stores learning-time prediction performance of a model, which is evaluated during the machine learning, and then monitors operation-time prediction performance of the model when the model is run on new data. When the operation-time prediction performance falls below the learning-time prediction performance, the data analysis apparatus determines that there has been a change in the trend of data and learns again the model using a new training dataset generated by processing the original data in a method different from the previous one.

International Publication Pamphlet No. WO 2011052025
Japanese Laid-open Patent Publication No. 2013-182621
Japanese Laid-open Patent Publication No. 2014-71493
Foster Provost, David Jensen, and Tim Oates, "Efficient Progressive Sampling", Proceedings of the $5^{th}$ International Conference on Knowledge Discovery and Data Mining, pp. 23-32, Association for Computing Machinery (ACM), 1999

In the progressive sampling described in the literature "Efficient Progressive Sampling" above, when a machine learning algorithm is executed again after executing the machine learning algorithm on a training dataset of a given size, the size of a training dataset to be used next is predetermined. That is, the training dataset size is selected each time from a plurality of predetermined sizes in ascending order.

In addition, there are various types of machine learning algorithms such as logistic regression analyses, support vector machines (SVMs), and random forests. It is often the case that the prediction performance of a model varies with different machine learning algorithms even if the same training dataset is used. In this regard, while the progressive sampling discussed in the above-mentioned literature addresses the use of a single machine learning algorithm only, the literature does not examine the use of a plurality of machine learning algorithms.

Therefore, what remains as a task ahead is how to generate a model with high prediction performance efficiently when there are a plurality of machine learning algorithm candidates and a plurality of training dataset size candidates.

SUMMARY

According to one embodiment, there is provided a non-transitory computer-readable storage medium storing a computer program that causes a computer to perform a procedure including identifying a maximum prediction performance score amongst a plurality of prediction performance scores corresponding to a plurality of models generated by executing each of a plurality of machine learning algorithms using one or more training dataset sizes; calculating, for a first machine learning algorithm having generated a model corresponding to the maximum prediction performance score amongst the plurality of machine learning algorithms, based on execution results obtained by executing the first machine learning algorithm using the one or more training dataset sizes, first estimated prediction performance scores and first estimated runtimes for a case of executing the first machine learning algorithm using each of two or more training dataset sizes different from the one or more training dataset sizes, and determining, based on the maximum prediction performance score, the first estimated prediction performance scores, and the first estimated runtimes, a first training dataset size to be used when the first machine learning algorithm is executed next time; and calculating, for a second machine learning algorithm different from the first machine learning algorithm amongst the plurality of machine learning algorithms, based on execution results obtained by executing the second machine learning algorithm using the one or more training dataset sizes, second estimated prediction performance scores and second estimated runtimes for a case of executing the second machine learning algorithm using each of two or more training dataset sizes different from the one or more training dataset sizes, and determining, based on the maximum prediction performance score, the second estimated prediction performance scores, and the second estimated runtimes, a second training dataset size to be used when the second machine learning algorithm is executed next time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of a machine learning progress screen;

FIG. 15 illustrates an example of a history table, a function table, and a schedule table;

DESCRIPTION OF EMBODIMENTS

Figure 1:
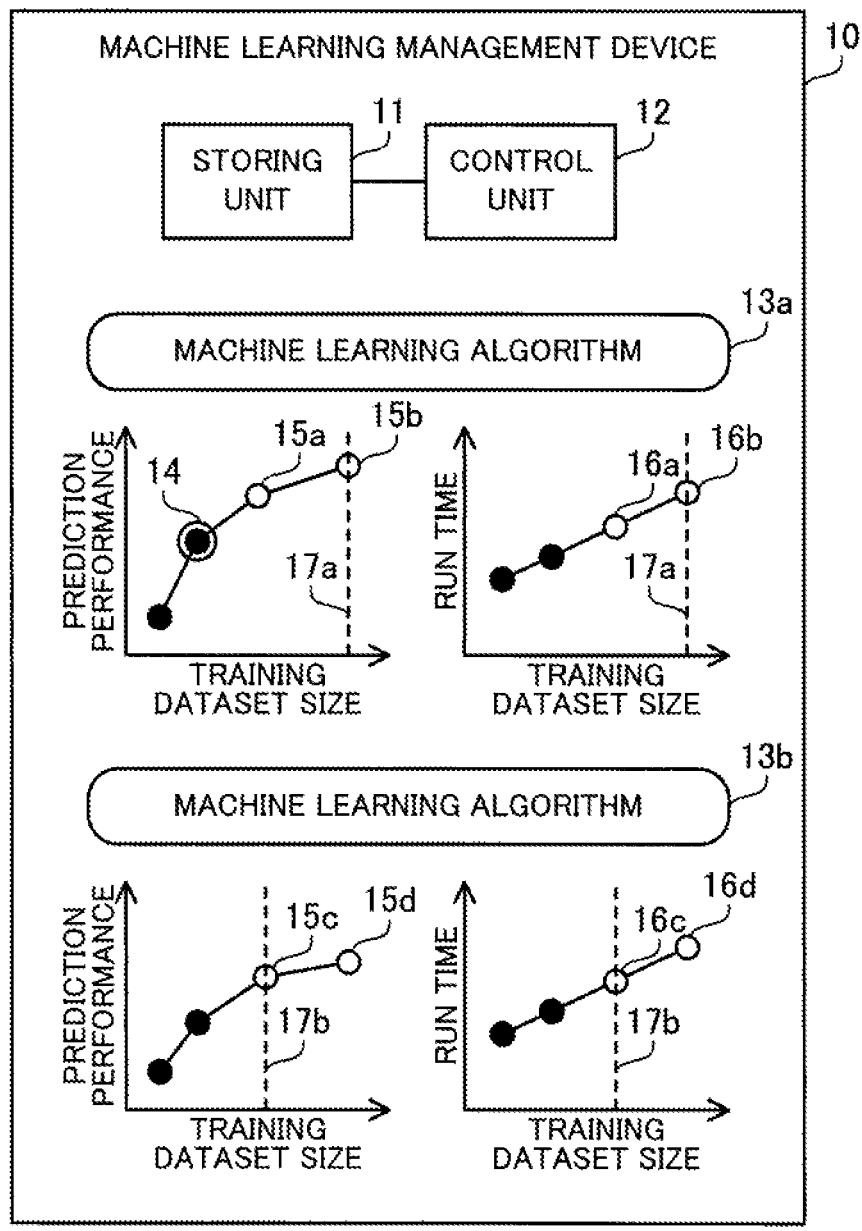
FIG. 1 illustrates an example of a machine learning management device.

Several embodiments will be described below with reference to the accompanying drawings. In the following description and the accompanying drawings, like reference numerals refer to like elements having substantially the same functions, and a repeated description thereof may be omitted.

(a) First Embodiment

FIG. 1 illustrates an example of a machine learning management device. A machine learning management device 10 of a first embodiment manages machine learning for generating, from a training dataset, a model for predicting the outcomes of an unknown instance. The machine learning for generating the model from the training dataset may be carried out by the machine learning management device 10 or a different device. The machine learning management device 10 may be a client computer operated by the user, or a server computer accessed from a client computer via a network.

The machine learning management device 10 includes a storing unit 11 and a control unit 12. The storing unit 11 may be volatile semiconductor memory such as random access memory (RAM), or a non-volatile storage device such as a hard disk drive (HDD) or flash memory. The control unit 12 is, for example, a processor such as a central processing unit (CPU) or a digital signal processor (DSP). Note however that, the control unit 12 may include an electronic circuit designed for specific use, such as an application specific integrated circuit (ASIC) or a field programmable gate array (FPGA). The processor executes programs stored in memory, such as RAM (for example, in the storing unit 11). The programs include a machine learning management program. The term "processor" here also refers to a set of multiple processors (i.e., multiprocessor).

The storing unit 11 stores execution results of a plurality of machine learning algorithms, obtained up to the present time. The machine learning algorithms available for machine learning include various types such as logistic regression analyses, support vector machines, and random forests. Machine learning algorithms which are of the same type but have different hyperparameters that control the behavior of the machine learning algorithms may be treated as different machine learning algorithms. Iterative execution of a plurality of machine learning algorithms with changing the size of a training dataset (for example, using a progressively larger training dataset each time) enables efficient convergence to a model with sufficiently high prediction performance. In the case of using a set of data sampled from a data population as a training dataset, the size of the training dataset may also be referred to as the "sample size".

Information stored in the storing unit 11 indicates, at least, a plurality of prediction performance scores corresponding to a plurality of models generated up to the present time. The prediction performance is the model's ability to accurately predict the outcomes of an unknown instance, and may be referred to as the "degree of accuracy" of the model. Any prediction performance index may be used here, such as accuracy, precision, and the root mean square error (RMSE). The models are generated by executing each of a plurality of machine learning algorithms on a training dataset of one size or training datasets of two or more different sizes. Note that the storing unit 11 may also store the training datasets. In addition, the storing unit 11 may further store a machine learning program with machine learning algorithms.

The control unit 12 controls machine learning that uses a plurality of machine learning algorithms and a plurality of training dataset sizes, and aims at enabling fast convergence to a model with high prediction performance. By referring to the information stored in the storing unit 11, the control unit 12 identifies a maximum prediction performance score 14, which is the maximum score amongst the prediction performance scores of the models generated up to the present time.

As for a machine learning algorithm 13a having generated a model with the maximum prediction performance score 14 amongst the plurality of machine learning algorithms, the control unit 12 determines a training dataset size 17a to be used when the machine learning algorithm 13a is executed next time. In this regard, based on execution results obtained by executing the machine learning algorithm 13a using one or more training dataset sizes, the control unit 12 calculates estimated prediction performance scores 15a and 15b and estimated runtimes 16a and 16b for the case of executing the machine learning algorithm 13a using each of two or more training dataset sizes different from the already used one or more training dataset sizes. The execution results used include, for example, one or more measured prediction performance scores and one or more measured runtimes. The two or more different training dataset sizes are dataset sizes that have yet to be used for the machine learning algorithm 13a and, for example, larger than the training dataset sizes already used. The estimated prediction performance scores 15a and 15b are estimates of the prediction performance while the estimated runtimes 16a and 16b are estimates of the runtimes. For example, the control unit 12 calculates the estimated prediction performance scores 15a and 15b by regression analysis based on the measured prediction performance scores associated with the machine learning algorithm 13a. In addition, for example, the control unit 12 calculates the estimated runtimes 16a and 16b by regression analysis based on the measured runtimes associated with the machine learning algorithm 13a.

Subsequently, based on the maximum prediction performance score 14, the estimated prediction performance scores 15a and 15b, and the estimated runtimes 16a and 16b, the control unit 12 determines the training dataset size 17a. For example, with respect to each of the two or more different training dataset sizes, the control unit 12 calculates an increase rate indicating an increment in the maximum prediction performance score 14 per unit time. The increase rate of the machine learning algorithm 13a is obtained, for example, by subtracting the maximum prediction performance score from the corresponding estimated prediction performance score and then dividing the subtraction result by the corresponding estimated runtime.

The control unit 12 may determine a training dataset size with the maximum increase rate as the training dataset size 17a. Alternatively, the control unit 12 may determine, as the training dataset size 17a, a training dataset size larger than the training dataset size with the maximum increase rate when the maximum increase rate of the machine learning algorithm 13a is higher than those of other machine learning algorithms. This is because, in the above situation, even if the machine learning algorithm 13a is executed using the training dataset size with the maximum increase rate, it is likely to subsequently execute the machine learning algorithm 13a again using a larger training dataset size. Yet alternatively, the control unit 12 may determine, as the training dataset size 17a, a training dataset size smaller than the training dataset size with the maximum increase rate when the estimated prediction performance scores 15a and 15b, the estimated runtimes 16a and 16b, and the like satisfy a predetermined condition.

On the other hand, as for a machine learning algorithm 13b different from the machine learning algorithm 13a amongst the plurality of machine learning algorithms, the control unit 12 determines a training dataset size 17b to be used when the machine learning algorithm 13b is executed next time. In this regard, based on execution results obtained by executing the machine learning algorithm 13b using one or more training dataset sizes, the control unit 12 calculates estimated prediction performance scores 15c and 15d and estimated runtimes 16c and 16d for the case of executing the machine learning algorithms 13b using each of two or more training dataset sizes different from the already used one or more training dataset sizes. The already used one or more training dataset sizes may be the same, or different, between the machine learning algorithms 13a and 13b. In addition, the two or more different training dataset sizes may be the same, or different, between the machine learning algorithms 13a and 13b. The estimated prediction performance scores 15c and 15d are estimates of the prediction performance while the estimated runtimes 16c and 16d are estimates of the runtimes. For example, the control unit 12 calculates the estimated prediction performance scores 15c and 15d by regression analysis based on the measured prediction performance scores associated with the machine learning algorithm 13b. In addition, for example, the control unit 12 calculates the estimated runtimes 16c and 16d by regression analysis based on the measured runtimes associated with the machine learning algorithm 13b.

Subsequently, based on the maximum prediction performance score 14, the estimated prediction performance scores 15c and 15d, and the estimated runtimes 16c and 16d, the control unit 12 determines the training dataset size 17b. For example, the control unit 12 calculates the increase rate with respect to each of the two or more different training dataset sizes. The control unit 12 may determine a training dataset size with the maximum increase rate as the training dataset size 17b. Alternatively, the control unit 12 may determine, as the training dataset size 17b, a training dataset size larger than the training dataset size with the maximum increase rate when the maximum increase rate of the machine learning algorithm 13b is higher than those of other machine learning algorithms. Yet alternatively, the control unit 12 may determine, as the training dataset size 17b, a training dataset size smaller than the training dataset size with the maximum increase rate when the estimated prediction performance scores 15c and 15d, the estimated runtimes 16c and 16d, and the like satisfy a predetermined condition. The predetermined condition is, for example, that the probability of failing to generate a model with a prediction performance score exceeding the current maximum prediction performance score 14 when the machine learning algorithm 13b is executed using the training dataset size with the maximum increase rate is equal to or greater than a fixed threshold.

The training dataset sizes 17a and 17b may be different from each other. In addition, the difference or ratio between a training dataset size used last time to execute the machine learning algorithm 13a and the training dataset size 17a may be different from the difference or ratio between a training dataset size used last time to execute the machine learning algorithm 13b and the training dataset size 17b. That is, there is no need for the increment or increasing rate of the training dataset size to be fixed, and the training dataset size to be used next is dynamically determined for each machine learning algorithm according to the progress of the machine learning.

Note that the control unit 12 may preferentially select, amongst the plurality of machine learning algorithms, a machine learning algorithm with the maximum increase rate being high. In the case of selecting the machine learning algorithm 13a, the control unit 12 executes the machine learning algorithm 13a using the training dataset size 17a. In the case of selecting the machine learning algorithm 13b, the control unit 12 executes the machine learning algorithm 13b using the training dataset size 17b.

According to the machine learning management device 10 of the first embodiment, the maximum prediction performance score 14 is identified amongst the prediction performance scores of the models generated up to the present time. As for the machine learning algorithm 13a having generated a model with the maximum prediction performance score 14, the training dataset size 17a to be used next is determined based on the maximum prediction performance score 14, the estimated prediction performance scores 15a and 15b, and the estimated runtimes 16a and 16b. In addition, as for the machine learning algorithm 13b, the training dataset size 17b to be used next is determined based on the maximum prediction performance score 14 achieved by the machine learning algorithm 13a, the estimated prediction performance scores 15c and 15d, and the estimated runtimes 16c and 16d.

Herewith, it is possible to accelerate the improvement rate of the prediction performance of a model in machine learning with iterative execution of a plurality of machine learning algorithms, which in turn enables fast convergence to a model with sufficient prediction performance. For example, selection of a training dataset size maximizing the estimated increase rate allows the maximum prediction performance score 14 to be improved fastest. In addition, it is possible to skip fruitless intermediate learning steps taking place when the increment or increasing rate of the training dataset size is too low. Further, useless execution of a large number of machine learning algorithms is controlled, which otherwise would take place when the increment or increase rate of the training dataset size is too high.

(b) Second Embodiment

Figure 2:
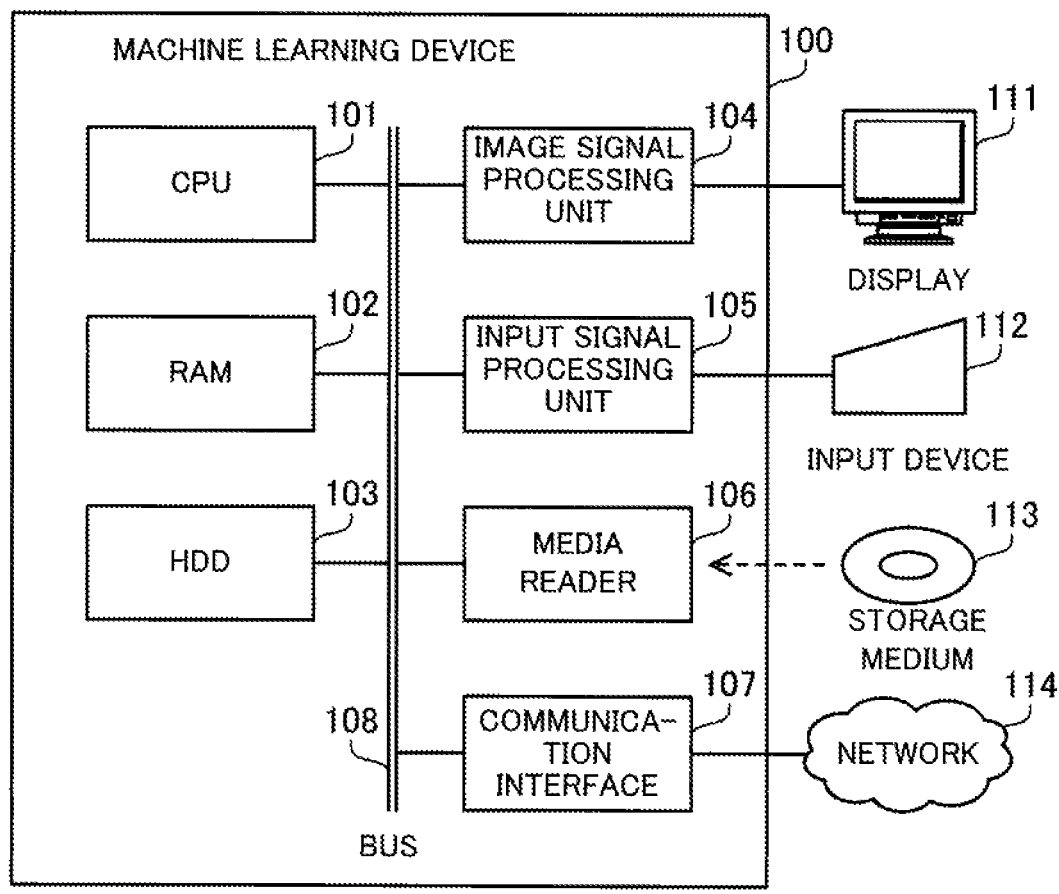
FIG. 2 is a block diagram illustrating an example of hardware of a machine learning device.

FIG. 2 is a block diagram illustrating an example of hardware of a machine learning device. A machine learning device 100 includes a CPU 101, RAM 102, a HDD 103, an image signal processing unit 104, an input signal processing unit 105, a media reader 106, and a communication interface 107. These individual units are connected to a bus 108. Note that the machine learning device 100 corresponds to the machine learning management device 10 of the first embodiment. The CPU 101 corresponds to the control unit 12 of the first embodiment. The RAM 102 or the HDD 103 corresponds to the storing unit 11 of the first embodiment.

The CPU 101 is a processor including a computing circuit for carrying out program instructions. The CPU 101 loads at least part of a program and data stored in the HDD 103 into the RAM 102 to execute the program. Note that the CPU 101 may include a plurality of processor cores and the machine learning device 100 may include a plurality of processors, and processes to be described later may be executed in parallel using the plurality of processors or processor cores. In addition, a set of a plurality of processors (multiprocessor) may be referred to as the "processor".

The RAM 102 is volatile semiconductor memory for temporarily storing therein programs to be executed by the CPU 101 and data to be used by the CPU 101 for its computation. Note that the machine learning device 100 may be provided with a different type of memory other than RAM, or may be provided with a plurality of memory devices. The HDD 103 is a non-volatile memory device to store therein software programs, such as an operating system (OS), middleware, and application software, and various types of data. The programs include a machine learning management program. Note that the machine learning device 100 may be provided with a different type of memory device, such as flash memory or a solid state drive (SSD), or may be provided with a plurality of non-volatile memory devices.

The image signal processing unit 104 outputs an image on a display 111 connected to the machine learning device 100 according to an instruction from the CPU 101. Various types of displays including the following may be used as the display 111: a cathode ray tube (CRT) display; a liquid crystal display (LCD); a plasma display panel (PDP); and an organic electro-luminescence (OEL) display. The input signal processing unit 105 acquires an input signal from an input device 112 connected to the machine learning device 100 and sends the input signal to the CPU 101. Various types of input devices including the following may be used as the input device 112: a pointing device, such as a mouse, a touch panel, a touch-pad, and a trackball; a keyboard; a remote controller; and a button switch. In addition, a plurality of types of input devices may be connected to the machine learning device 100.

The media reader 106 is a reader for reading programs and data recorded in a storage medium 113. As the storage medium 113, any of the following may be used: a magnetic disk, an optical disk, a magneto-optical disk (MO), and semiconductor memory. Examples of the magnetic disk include a flexible disk (FD) and a HDD. Examples of the optical disk are a compact disc (CD) and a digital versatile disc (DVD). The media reader 106 copies the programs and data read from the storage medium 113 to a different storage medium, for example, the RAM 102 or the HDD 103. The read programs are executed, for example, by the CPU 101. Note that the storage medium 113 may be a portable storage medium, and may be used to distribute the programs and data. In addition, the storage medium 113 and the HDD 103 are sometimes referred to as computer-readable storage media. The communication interface 107 is connected to a network 114 and communicates with other information processors via the network 114. The communication interface 107 may be a wired communication interface connected via a cable to a communication device, such as a switch, or a wireless communication interface connected via a wireless link to a base station.

Next described are the relationship among the sample size, prediction performance, and runtime in machine learning, and progressive sampling. In the machine learning of the second embodiment, data including a plurality of unit data elements representing known instances is collected in advance. The machine learning device 100 or a different information processor may collect data from various types of devices such as sensor devices via the network 114. The data collected may be data being large in size, so-called "big data". Each unit data element usually includes one or more explanatory variable values and one target variable value. For example, in machine learning for predicting demand for commercial products, actual result data is collected in which a cause or causes (e.g. temperature and humidity) affecting the demand for the commercial products are used as explanatory variables and the demand for the commercial products is used as a target variable.

The machine learning device 100 samples a subset of unit data elements from the collected data as a training dataset, and learns a model using the training dataset. The model represents a relationship between explanatory and target variables, and usually includes two or more explanatory variables, two or more coefficients, and one target variable. The model may be represented by a mathematical expression selected from various types, such as linear equations, polynomials of degree 2 or higher, exponential functions, and logarithmic functions. The type of the mathematical expression may be designated by the user prior to the machine learning. The coefficients are determined in the machine learning based on the training dataset.

The use of the learned model allows a prediction of a target variable value (effect) of an unknown instance from explanatory variable values (cause) of the unknown instance. For example, it is possible to predict demand for commercial products of the next season from weather forecasting for the next season. The effect predicted by the model may be a continuous value, for example, a probability value between 0 and 1 inclusive, or a discrete value, for example, a binary value of YES or NO.

For the learned model, "prediction performance" is calculated. The prediction performance indicates the model's ability to accurately predict the effect of an unknown instance, and may be referred to as the "degree of accuracy" of the model. The machine learning device 100 samples, as a testing dataset, a subset of unit data elements from the collected data except for the training dataset, and calculates the prediction performance using the testing dataset. Assume that the size of the testing dataset is, for example, about half the size of the training dataset. The machine learning device 100 inputs the explanatory variable values included in the testing dataset into the model, and then compares target variable values output from the model (predicted values) against the target variable values included in the testing dataset (actual, or observed, values). Note that the process of examining the prediction performance of the learned model may be referred to as "validation".

Examples of prediction performance indexes include accuracy, precision, and RMSE. Assume here that the effect is represented by a binary value of YES or NO. Amongst N testing dataset instances, the number of instances with both the predicted and the actual values being YES is denoted by Tp, the number of instances with the predicted value being YES but the actual value being NO is denoted by Fp, the number of instances with the predicted value being NO but the actual value being YES is denoted by Fn, and the number of instances with both the predicted and the actual values being NO is denoted by Tn. In this case, accuracy is the proportion of all predictions that are correct, and calculated as $(Tp+Tn)/N$. Precision is the proportion of all positive predictions (i.e., YES) that are correct, and calculated as $Tp/(Tp+Fp)$. RMSE is calculated as $(sum(y-\hat{y})^2/N)^{1/2}$ where y is the actual value of each of the instances and $\hat{y}$ is the predicted value of the instance.

Figure 3:
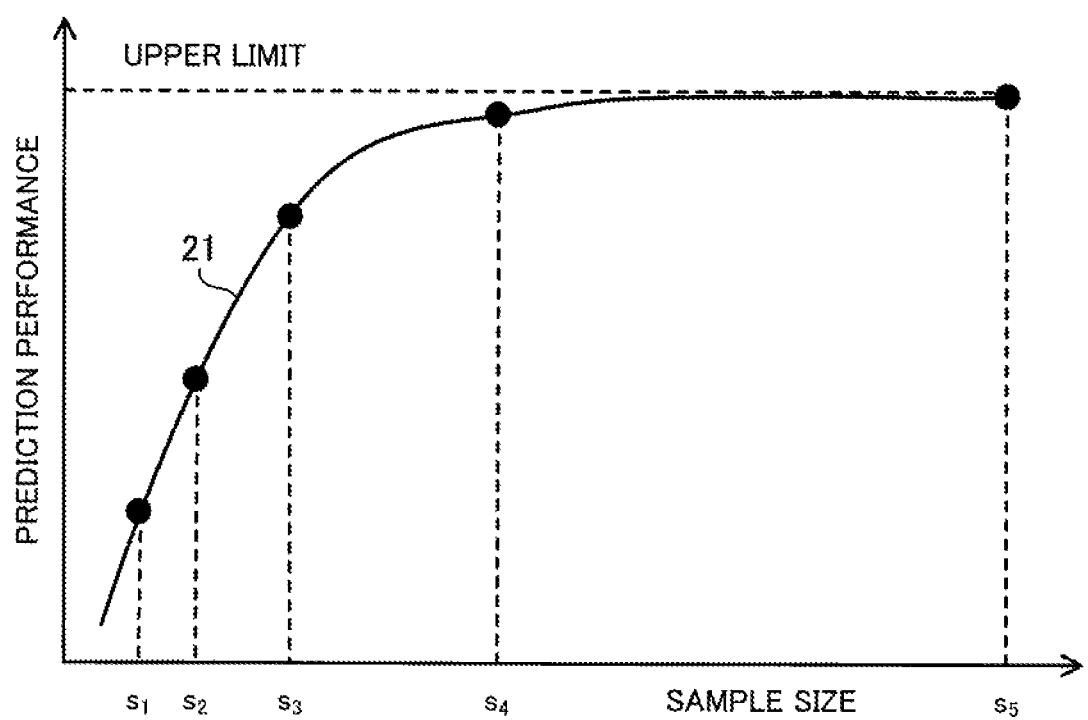
FIG. 3 is a graph representing an exemplary relationship between sample size and prediction performance.

In the case of using a single machine learning algorithm, higher prediction performance is achieved, in general, with a larger number of unit data elements sampled as the training dataset (i.e., a larger sample size). FIG. 3 is a graph representing an exemplary relationship between sample size and prediction performance. A curve 21 represents the relationship between prediction performance of a model and sample size. The magnitude relationship among sample sizes $s_1$, $s_2$, $s_3$, $s_4$, and $s_5$ is $s_1<s_2<s_3<s_4<s_5$. For example, $s_2$ is double or quadruple the size of $s_1$; $s_3$ is double or quadruple the size of $s_2$; $s_4$ is double or quadruple the size of $s_3$; and $s_5$ is double or quadruple the size of $s_4$.

As illustrated by the curve 21, higher prediction performance is achieved with the sample size $s_2$ than with the sample size $s_1$; higher prediction performance is achieved with the sample size $s_3$ than with the sample size $s_2$; higher prediction performance is achieved with the sample size $s_4$ than with the sample size $s_3$; and higher prediction performance is achieved with the sample size $s_5$ than with the sample size $s_4$. Thus, in general, higher prediction performance is achieved with a larger sample size. Note however that when the prediction performance remains low, the prediction performance increases rapidly as the sample size increases. On the other hand, there is an upper limit on the prediction performance, and the ratio of the increase in the prediction performance to the increase in the sample size starts gradually decreasing as the prediction performance comes close to the upper limit.

In addition, a larger sample size takes more learning time for the machine learning. Therefore, if the sample size is excessively large, the machine learning becomes inefficient in terms of the amount of time spent for learning. In the case of the example illustrated in FIG. 3, with the sample size $s_4$, prediction performance close to the upper limit is achieved in a short time. On the other hand, with the sample size $s_3$, the prediction performance may possibly be insufficient. With the sample size $s_5$, although the prediction performance is close to the upper limit, the increase in the prediction performance per unit runtime is slight, therefore resulting in inefficient machine learning.

Such a relationship between the sample size and the prediction performance changes depending on properties of data used (the type of data) even if the same machine learning algorithm is used. Therefore, it is difficult to estimate the minimum sample size needed to achieve prediction performance at, or close to, the upper limit prior to the machine learning. In view of this problem, a machine learning method known as progressive sampling has been proposed. The progressive sampling is described in the above-mentioned literature "Efficient Progressive Sampling", for example.

The progressive sampling starts with a small sample size and uses progressively larger ones, and repeats machine learning until the prediction performance satisfies a predetermined condition. For example, the machine learning device 100 performs machine learning with the sample size $s_1$ and evaluates the prediction performance of a learned model. If the prediction performance is not sufficient, the machine learning device 100 then performs machine learning with the sample size $s_2$ and evaluates the prediction performance. In this regard, the training dataset of the sample size $s_2$ may include part or all of the training dataset of the sample size $s_1$ (i.e., the training dataset previously used). In like fashion, the machine learning device 100 performs machine learning with the sample size $s_3$ and evaluates the prediction performance, and then performs machine learning with the sample size $s_4$ and evaluates the prediction performance. When sufficient prediction performance is achieved with the sample size $s_4$, the machine learning device 100 stops the machine learning and adopts a model learned with the sample size $s_4$. In this case, the machine learning device 100 does not need to perform machine learning with the sample size $s_5$.

As described above, the progressive sampling learns a model and evaluates prediction performance of the model for each iteration with a given sample size (one learning step). As a procedure for examining the prediction performance of the learned model in each learning step (a validation technique), cross-validation or random subsampling validation may be used, for example. In the cross-validation technique, the machine learning device 100 divides sampled data elements into K blocks (K is an integer equal to 2 or greater), and uses one block amongst the K blocks as a testing dataset and the other K−1 blocks as a training dataset. The machine learning device 100 repeats model learning and evaluation of the prediction performance K times, each time using a different block as the testing dataset. As a result of one learning step, a model with the highest prediction performance amongst K models created and average prediction performance over the K rounds are obtained, for example. The cross-validation enables evaluation of the prediction performance using a limited amount of data.

In the random subsampling validation, the machine learning device 100 randomly samples a training dataset and a testing dataset from a data population, then learns a model using the training dataset, and calculates prediction performance of the model using the testing dataset. The machine learning device 100 repeats the sampling, the model learning, and the evaluation of the prediction performance K times. Each sampling is sampling without replacement. That is, in each sampling round, the same unit data element is not included in the training dataset more than one time, and the same unit data element is not included in the testing dataset more than one time. In addition, in each sampling process, the same unit data element is not selected into both the training dataset and the testing dataset. Note however that over the K sampling rounds, the same unit data element may be selected more than once. As a result of one learning step, a model with the highest prediction performance amongst K models created and average prediction performance over the K rounds are obtained, for example.

Note that there are various types of procedures (machine learning algorithms) for learning a model from a training dataset. The machine learning device 100 is able to use a plurality of machine learning algorithms. Several tens to hundreds of machine learning algorithms may be available for the machine learning device 100. Examples of such machine learning algorithms include logistic regression analyses, support vector machines, and random forests. A logistic regression analysis is a regression analysis using an S-shaped curve to fit the relationship between values of a target variable y and values of explanatory variables $x_1$, $x_2$, ..., and $x_k$. The target variable y and the explanatory variables $x_1$, $x_2$, ..., and $x_k$ are assumed to satisfy the following equation: $\log(y/(1-y)) = a_1 x_1 + a_2 x_2 + \ldots + a_k x_k + b$, where $a_1, a_2, \ldots, a_k$, and b are coefficients determined in the regression analysis. A support vector machine is a machine learning algorithm for calculating a boundary that best separates a set of unit data elements in an n-dimensional space into two classes. The boundary is calculated in such a manner as to maximize the distance to the boundary (margin) for each class.

A random forest is a machine learning algorithm that generates a model for appropriately classifying a plurality of unit data elements. In the random forest, unit data elements are randomly sampled from a data population. Some explanatory variables are randomly selected, and the sampled unit data elements are classified according to values of the selected explanatory variables. The selection of explanatory variables and the classification of unit data elements are repeated to thereby generate a hierarchical decision tree based on values of a plurality of explanatory variables. Then, the sampling of unit data elements and the generation of a decision tree are repeated to obtain a plurality of decision trees, which are then combined to produce a final model for classifying unit data elements.

A machine learning algorithm may have one or two or more hyperparameters for controlling the behavior of the machine learning algorithm. Unlike coefficients (parameters) included in a model, the value of such a hyperparameter is not determined through machine learning and needs to be set prior to executing the machine learning algorithm. Examples of hyperparameters include the number of decision trees for a random forest, the fitting rate of a regression analysis, and the degrees of polynomials included in a model. Each hyperparameter may take a fixed value or a value designated by the user. The values of hyperparameters have some influence on the prediction performance of a model to be generated. The prediction performance of a model may change with different values set for hyperparameters even when the same machine learning algorithm and sample size are used. According to the second embodiment, machine learning algorithms which are of the same type but have different hyperparameter values may be treated as different machine learning algorithms. A combination of the type of a machine learning algorithm and the values of hyperparameters is sometimes referred to as a configuration. That is, the machine learning device 100 may treat different configurations as different machine learning algorithms.

Figure 4:
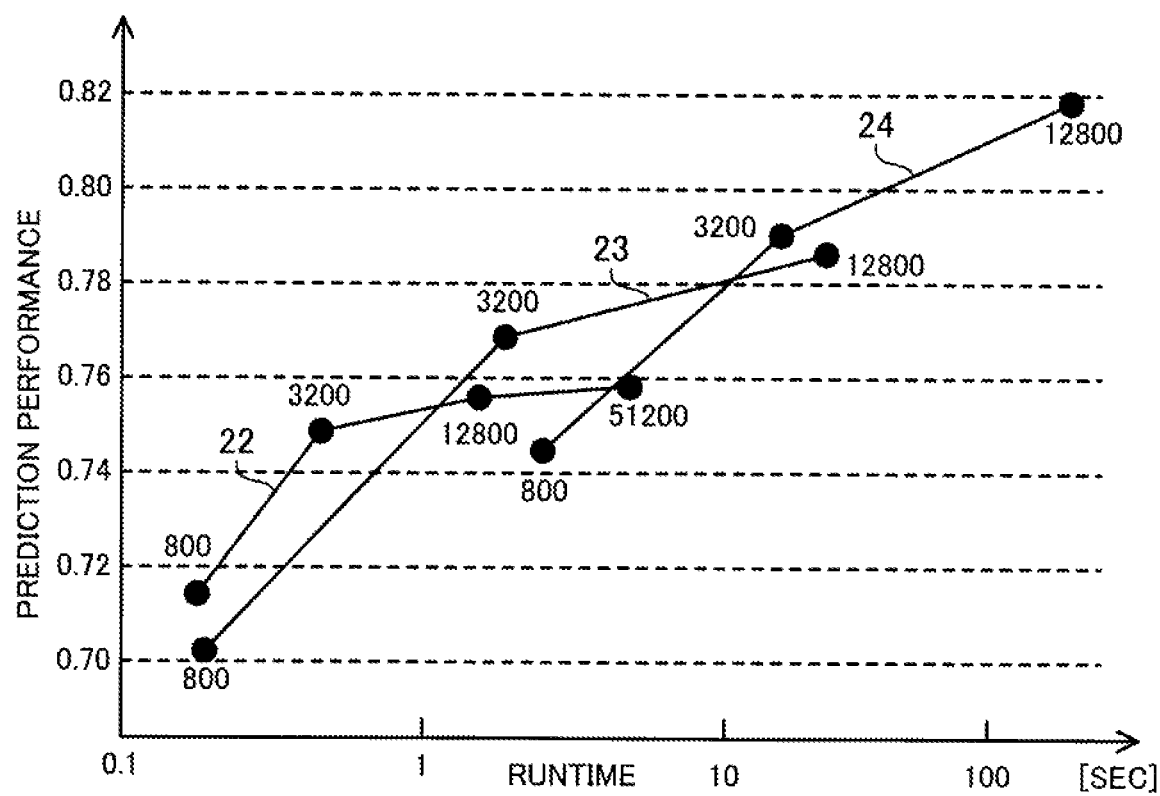
FIG. 4 is a graph representing an exemplary relationship between runtime and the prediction performance.

FIG. 4 is a graph representing an exemplary relationship between the runtime and the prediction performance. Curves 22 to 24 represent the relationships between the runtime and the prediction performance measured using a well-known data set (Cover Type). Accuracy is used here as a prediction performance index. The curve 22 represents the relationship between the runtime and the prediction performance obtained when logistic regression is used as the machine learning algorithm. The curve 23 represents the relationship between the runtime and the prediction performance obtained when a support vector machine is used as the machine learning algorithm. The curve 24 represents the relationship between the runtime and the prediction performance obtained when a random forest is used as the machine learning algorithm. Note that the horizontal axis of FIG. 4 represents the runtime on a logarithmic scale.

As illustrated by the curve 22, in the case of using the logistic regression, the prediction performance is about 0.71 and the runtime is about 0.2 seconds for a sample size of 800; the prediction performance is about 0.75 and the runtime is about 0.5 seconds for a sample size of 3200; the prediction performance is about 0.755 and the runtime is about 1.5 seconds for a sample size of 12800; and the prediction performance is about 0.76 and the runtime is about 6 seconds for a sample size of 51200. As illustrated by the curve 23, in the case of using the support vector machine, the prediction performance is about 0.70 and the runtime is about 0.2 seconds for a sample size of 800; the prediction performance is about 0.77 and the runtime is about 2 seconds for a sample size of 3200; and the prediction performance is about 0.785 and the runtime is about 20 seconds for a sample size of 12800. As illustrated by the curve 24, in the case of using the random forest, the prediction performance is about 0.74 and the runtime is about 2.5 seconds for a sample size of 800; the prediction performance is about 0.79 and the runtime is about 15 seconds for a sample size of 3200; and the prediction performance is about 0.82 and the runtime is about 200 seconds for a sample size of 12800.

Thus, with the above-described data set, the logistic regression algorithm generally has a short runtime and provides low prediction performance. The support vector machine algorithm generally has a longer runtime and provides higher prediction performance than the logistic regression algorithm. The random forest algorithm generally has an even longer runtime and provides higher prediction performance than the support vector machine algorithm. Note however that, in the example of FIG. 4, the prediction performance of the support vector machine algorithm is lower than that of the logistic regression algorithm when the sample size is small. That is, different machine learning algorithms exhibit different types of ascending curve behavior of the prediction performance in the early stage of the progressive sampling.

In addition, as described above, the upper limit on the prediction performance and the ascending curve behavior of the prediction performance of each machine learning algorithm are also influenced by characteristics of data used. Therefore, it is difficult to identify in advance, amongst a plurality of machine learning algorithms, a machine learning algorithm with the highest upper limit on prediction performance or a machine learning algorithm achieving prediction performance close to the upper limit in the shortest amount of time. In view of this, the following examines how to efficiently obtain a model with high prediction performance in the case of using a plurality of machine learning algorithms and a plurality of sample sizes.

Figure 5:
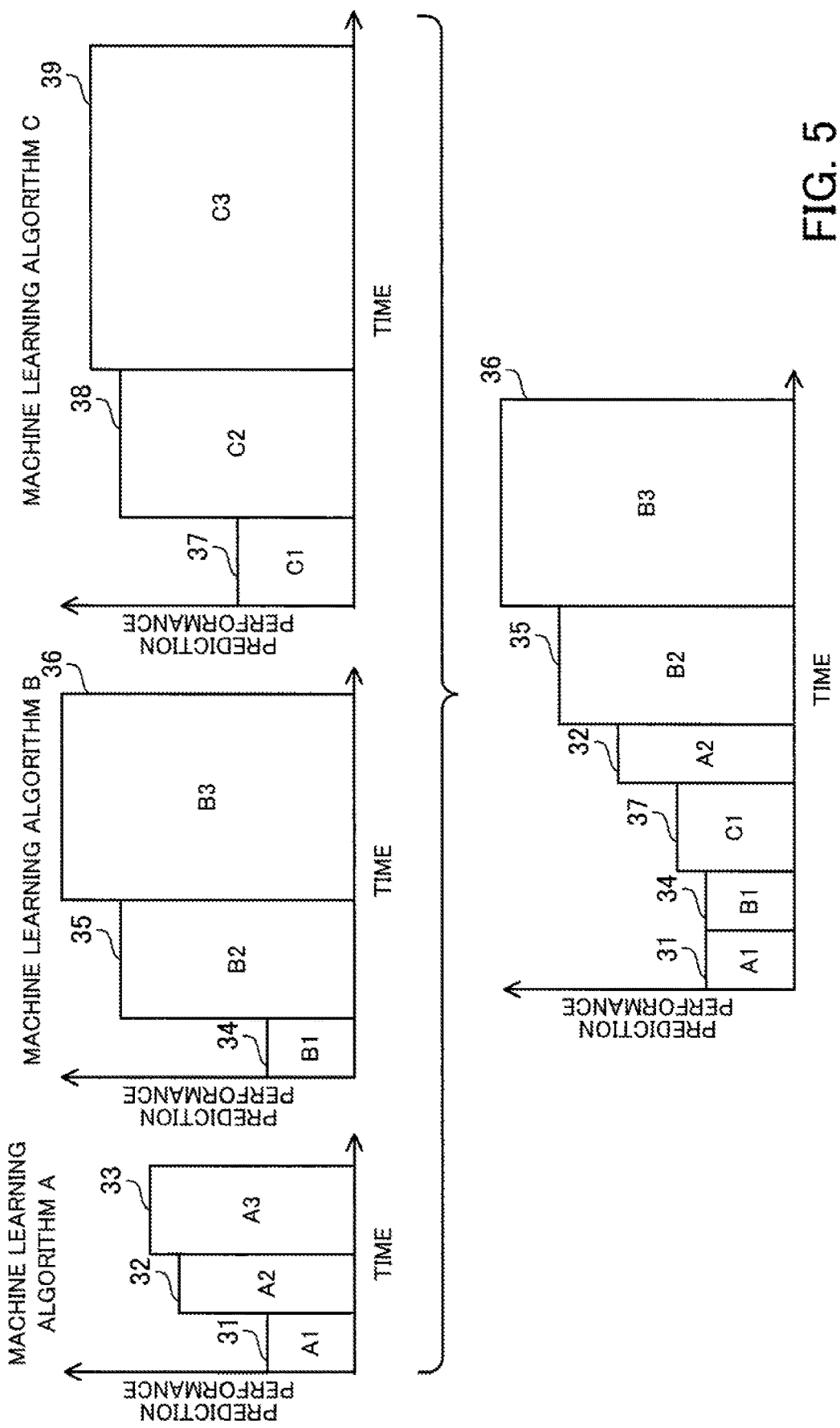
FIG. 5 illustrates an example of using a plurality of machine learning algorithms.

FIG. 5 illustrates an example of using a plurality of machine learning algorithms. Assume, for ease of explanation, that there are three machine learning algorithms A, B, and C. In the case of implementing progressive sampling using only the machine learning algorithm A, the machine learning device 100 carries out learning steps 31, 32, and 33 (A1, A2, and A3) in sequence. In the case of implementing progressive sampling using only the machine learning algorithm B, the machine learning device 100 carries out learning steps 34, 35, and 36 (B1, B2, and B3) in sequence. In the case of implementing progressive sampling using only the machine learning algorithm C, the machine learning device 100 carries out learning steps 37, 38, and 39 (C1, C2, and C3) in sequence. Assume here that a condition to stop the progressive sampling is satisfied in each of the learning steps 33, 36, and 39.

The same sample size is used for the learning steps 31, 34, and 37. For example, 10,000 unit data elements are used in each of the learning steps 31, 34, and 37. The same sample size is used for the learning steps 32, 35, and 38, and about double or quadruple the sample size for the learning steps 31, 34, and 37. For example, 40,000 unit data elements are used in each of the learning steps 32, 35, and 38. The same sample size is used for the learning steps 33, 36, and 39, and about double or quadruple the sample size for the learning steps 32, 35, and 38. For example, 160,000 unit data elements are used in each of the learning steps 33, 36, and 39.

In order to combine the machine learning algorithms A, B, and C and the progressive sampling approach, the following method, for example, is applicable. The method includes estimating, for each of the machine learning algorithms A, B, and C, the improvement rate of the prediction performance in the case of performing a learning step with one sample size larger, and selecting a machine learning algorithm with the highest improvement rate and then advancing one learning step of the selected machine learning algorithm. Each time one learning step is completed, the estimated improvement rates of the individual machine learning algorithms are revised. Therefore, learning steps of a plurality of machine learning algorithms are performed simultaneously in the beginning, but the machine learning algorithms are then gradually whittled down.

The estimated improvement rate of each machine learning algorithm is found by dividing an estimated performance improvement amount by an estimated runtime. The estimated performance improvement amount is a difference between estimated prediction performance for the next learning step and the maximum amongst prediction performance results achieved by a plurality of machine learning algorithms up to the present time (hereinafter sometimes referred to as the "achieved prediction performance"). The achieved prediction performance corresponds to the maximum prediction performance score 14 of the first embodiment. The prediction performance for the next learning step is estimated based on previous prediction performance results of the same machine learning algorithm and the sample size to be used in the next learning step. The estimated runtime is an estimate of the time needed for the next learning step, and the estimation is made based on previous runtimes of the same machine learning algorithm and the sample size to be used in the next learning step.

The machine learning device 100 executes the learning step 31 of the machine learning algorithm A, the learning step 34 of the machine learning algorithm B, and the learning step 37 of the machine learning algorithm C. Based on execution results of the learning steps 31, 34, and 37, the machine learning device 100 estimates the improvement rate of each of the machine learning algorithms A, B, and C. Assume here that the following estimated improvement rates are obtained: 2.5 for the machine learning algorithm A; 2.0 for the machine learning algorithm B; and 1.0 for the machine learning algorithm C. In this case, the machine learning device 100 selects the machine learning algorithm A with the highest improvement rate and then executes the learning step 32.

After completing the learning step 32, the machine learning device 100 updates the improvement rates of the machine learning algorithms A, B, and C. Assume that the following estimated improvement rates are obtained: 0.73 for the machine learning algorithm A; 1.0 for the machine learning algorithm B; and 0.5 for the machine learning algorithm C. Because the achieved prediction performance has been elevated by the learning step 32, the improvement rates of the machine learning algorithms B and C have also decreased. The machine learning device 100 selects the machine learning algorithm B with the highest improvement rate and then executes the learning step 35.

After completing the learning step 35, the machine learning device 100 updates the improvement rates of the machine learning algorithms A, B, and C. Assume that the following estimated improvement rates are obtained: 0.0 for the machine learning algorithm A; 0.8 for the machine learning algorithm B; and 0.0 for the machine learning algorithm C. The machine learning device 100 selects the machine learning algorithm B with the highest improvement rate and then executes the learning step 36. When it is determined that the prediction performance has sufficiently been elevated by the learning step 36, the machine learning ends. In this case, the learning step 33 of the machine learning algorithm A and the learning steps 38 and 39 of the machine learning algorithm C are not executed.

Note that in estimating the prediction performance for the next learning step, it is preferable to reduce the risk of prematurely cutting off machine learning algorithms whose prediction performance is likely to increase hereafter, in consideration of statistical errors. Toward this end, for example, the machine learning device 100 uses regression analysis to calculate the expected value of the prediction performance and its 95% prediction interval, and then adopts an upper confidence bound (UCB) of the 95% prediction interval as the estimated prediction performance used to calculate the improvement rates. The 95% prediction interval incorporates dispersion of measured prediction performance (measured values), and indicates that the new prediction performance is predicted to fall within the interval with a probability of 95%. That is, the value adopted is larger than the statistically expected value by the magnitude of the statistical errors. In other words, the UCB is the 97.5% quantile.

Note however that the machine learning device 100 may calculate, in place of the UCB, the probability of improving over the achieved prediction performance (the probability of improvement, or PI) by computing the integral of the distribution of the estimated prediction performance. Alternatively, the machine learning device 100 may calculate the expected value of improvement (expected improvement, or EI) where the prediction performance will exceed the achieved prediction performance by computing the integral of the distribution of the estimated prediction performance.

According to the above-described method, learning steps making little contribution to improving the prediction performance are not executed, which results in shortening the entire learning time. In addition, a learning step of a machine learning algorithm with the maximum performance improvement amount per unit time is preferentially executed each time. Therefore, even if the machine learning is terminated in the middle due to restrictions on the learning time, a model obtained by the finish time is the best model obtained within the time limit. Further, there is a possibility that learning steps making even a slight contribution to improving the prediction performance are executed although they may be run later in the execution order. Therefore, it is possible to reduce the risk of cutting off machine learning algorithms with high upper limits on the prediction performance.

However, in the above-described method, the sample size of each machine learning algorithm is increased at a fixed multiplication factor at a time. For this reason, the method still has room for further improvement in learning efficiency. First, when a learning step of a machine learning algorithm using a large sample size has succeeded in improving the achieved prediction performance, the runtime spent for preceding learning steps of the machine learning algorithm with smaller sample sizes turns out to be wasted. In the case where a learning step with a large sample size is likely to improve the achieved prediction performance, the learning time may be shortened by skipping learning steps with smaller sample sizes.

Second, an executed learning step may fail to improve the achieved prediction performance due to overestimation of the prediction performance caused by low estimation accuracy for the prediction performance. In the case where a learning step with a large sample size has failed to improve the achieved prediction performance, it turns out that the learning step with the large sample size would preferably not have been executed. In order to avoid this, when a learning step with a large sample size is less likely to improve the achieved prediction performance, one or more learning steps with a reduced rate of increase in the sample size are interpolated. This increases the number of measured values of the prediction performance, which in turn increases estimation accuracy. The increased estimation accuracy would provide a more reliable determination of whether a learning step with a large sample size is likely to fail to improve the achieved prediction performance. As a result, it is possible to avoid a learning step with a large sample size from being executed when it is determined to be likely to fail to improve the achieved prediction performance.

Third, machine learning algorithms involving a large amount of calculation are significantly susceptible to inefficiency caused by increasing the sample size at a fixed multiplication factor and likely to take an enormous amount of runtime. For example, as for machine learning algorithms with the calculation complexity being $O(N^3)$, the runtime increase rate due to an increase in the sample size is significantly high. Fourth, some machine learning algorithms have a large overhead, such as preprocessing to decentralize processes across a plurality of processors. Such an overhead may be fixed and free of influence from the sample size. In this case, very little change in the runtime is observed when the sample size is increased by one size while the sample size remains small. Therefore, as for machine learning algorithms with a large overhead, a small increment in the sample size leads to inefficiency.

Figure 6:
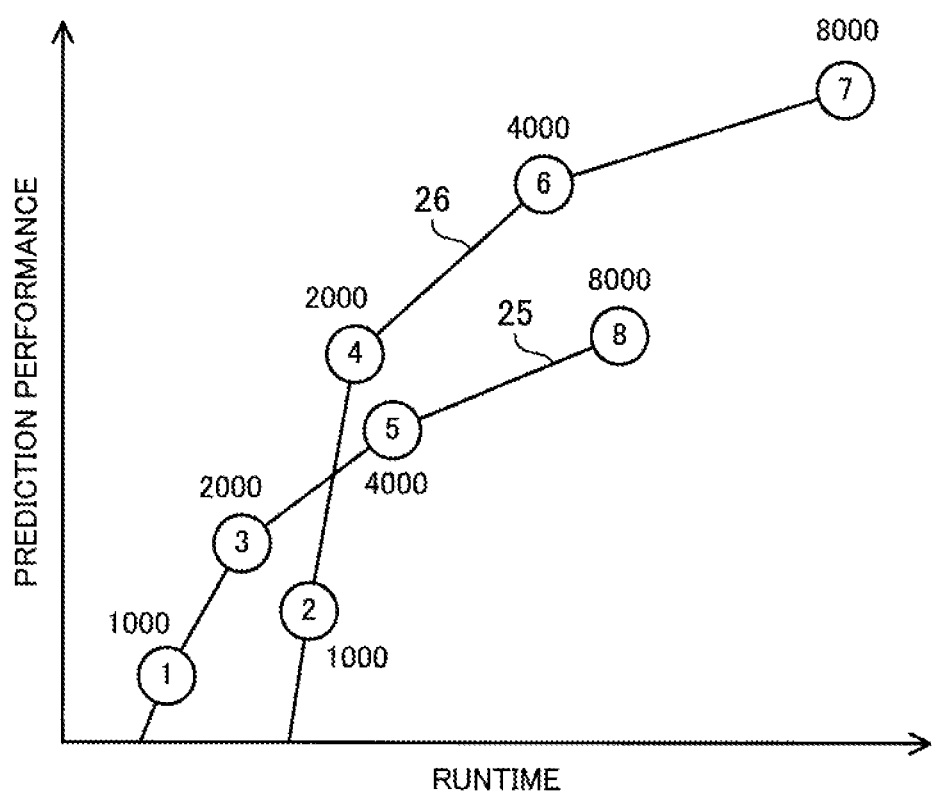
FIG. 6 is a graph illustrating an exemplary order of learning steps being executed.

FIG. 6 is a graph illustrating an exemplary order of learning steps being executed. Assume here that the sample size is increased at a fixed multiplication factor at a time. A curve 25 is associated with a machine learning algorithm (machine learning algorithm #1) and represents the relationship between the runtime and the prediction performance observed with changes in the sample size of the training dataset. A curve 26 is associated with a different machine learning algorithm (machine learning algorithm #2) and represents the relationship between the runtime and the prediction performance observed with changes in the sample size of the training dataset.

In this example, the machine learning device 100 first executes a learning step using the machine learning algorithm #1 with a sample size of 1000. Second, the machine learning device 100 executes a learning step using the machine learning algorithm #2 with a sample size of 1000. Third, the machine learning device 100 executes a learning step using the machine learning algorithm #1 with a sample size of 2000. Fourth, the machine learning device 100 executes a learning step using the machine learning algorithm #2 with a sample size of 2000. Fifth, the machine learning device 100 executes a learning step using the machine learning algorithm #1 with a sample size of 4000. As for the fifth learning step, the machine learning device 100 has determined that the prediction performance of the fifth learning step would be likely to be better than that of the fourth learning step, and then executes the machine learning algorithm #1. However, the prediction performance of the fifth learning step turns out to be worse than that of the fourth learning step (the achieved prediction performance at this point of time).

Sixth, the machine learning device 100 executes a learning step using the machine learning algorithm #2 with a sample size of 4000. Seventh, the machine learning device 100 executes a learning step using the machine learning algorithm #2 with a sample size of 8000. Eighth, the machine learning device 100 executes a learning step using the machine learning algorithm #1 with a sample size of 8000. As for the eighth learning step, the machine learning device 100 has determined that the prediction performance of the eighth learning step would be likely to be better than that of the seventh learning step, and then executes the machine learning algorithm #1. However, the prediction performance of the eighth learning step turns out to be worse than that of the seventh learning step (the achieved prediction performance at this point of time).

Note here that, in some cases, it is possible to determine, after the execution of the fifth learning step, that the learning step using the machine learning algorithm #2 with a sample size of 8000 would be likely to succeed in improving the achieved prediction performance. In this case, the machine learning device 100 executes a learning step with a sample size of 8000 while skipping the learning step with a sample size of 4000, thus saving time otherwise spent on executing the learning step with a sample size of 4000. Skipping intermediate sample sizes is effective especially when there are a large number of machine learning algorithm candidates. This is because early improvement in the achieved prediction performance screens out a lot of machine learning algorithms in an early stage, thereby quickly narrowing down machine learning algorithms to be executed.

On the other hand, in other cases, the possibility may remain even after the execution of the seventh learning step that the prediction performance of the machine learning algorithm #1 will improve much in the future because of not being able to estimate the prediction performance of the machine learning algorithm #1 with a high degree of accuracy based only on the results of the first, third, and fifth learning steps. In this case, it would be conceivable that the machine learning device 100 executes the machine learning algorithm #1 with a sample size smaller than 8000 (for example, 5000), instead of increasing the sample size from 4000 to 8000. If this increases estimation accuracy, the increased estimation accuracy would provide a more reliable determination of whether the prediction performance of the machine learning algorithm #1 is likely to overcome that of the machine learning algorithm #2. As a result, when the prediction performance of the machine learning algorithm #1 is determined to be less likely to overcome that of the machine learning algorithm #2, the machine learning device 100 is able to save time otherwise spent on executing the learning step with a sample size of 8000.

Making the increment of the sample size smaller is effective especially when there are a large number of machine learning algorithm candidates. This is because improvement in estimation accuracy for the prediction performance of each machine learning algorithm having only output evidently lower prediction performance than the current achieved prediction performance screens out a lot of machine learning algorithms in an early stage, thereby quickly narrowing down machine learning algorithms to be executed.

As has been described above, increasing the sample size of a plurality of machine learning algorithms at a fixed multiplication factor or by a fixed amount may introduce inefficiency into the machine learning. In addition, depending on the progress of the machine learning with a plurality of machine learning algorithms, using a larger sample size for a learning step to be executed next is preferable in some cases, but using a smaller sample size is preferable in other cases. In view of this, the machine learning device 100 of the second embodiment controls learning steps in the following manner.

Symbols defined below are used in the following description. The measured prediction performance is denoted by p; the estimated prediction performance is denoted by p*; the achieved prediction performance is denoted by P; the measured runtime is denoted by t; the estimated runtime is denoted by t*; the performance improvement amount is denoted by g*; the function used to calculate the performance improvement amount is denoted by fg( ); and the probability distribution of the prediction performance is denoted by Xp. Because the performance improvement amount depends on a value obtained from a probability distribution, such as the UCB, and the achieved prediction performance, it is represented by: $g^*=fg(Xp, P)$. In addition, the improvement rate is denoted by r*. Because the improvement rate is obtained by dividing the performance improvement amount by the runtime, it is represented by: $r^*=g^*/t^*$.

The threshold of the improvement rate is denoted by R, which is related to a stopping condition of the machine learning. For example, R is defined in advance as: $R=0.001/3600$. In addition, a machine learning algorithm is denoted by a; a set of machine learning algorithms is denoted by A; a data set is denoted by D; sample data elements extracted from a dataset is denoted by S; a sample size is denoted by s; and the number of machine learning algorithms is denoted by N.

In addition, the function used to calculate the estimated prediction performance is denoted by fp( ). Because the estimated prediction performance depends on the sample size, it is represented by: $p^*=fp(s)$. The function fp( ) is bounded above. For example, the following equation is applicable: $fp(s)=\beta_1 \alpha_1 \times s^{-\gamma}$, where $\alpha_1$, $\beta_1$, and $\gamma$ are coefficients determined by regression analysis with s being an explanatory variable and p being a target variable. The function fp( ) is defined for each machine learning algorithm. The function fp( ) defined for the machine learning algorithm a is denoted by a.fp( ).

The function used to calculate the probability distribution of the prediction performance is denoted by fXp( ). Because the probability distribution of the prediction performance depends on the sample size, it is represented by: $Xp=fXp(s)$. The estimated prediction performance p* is the expected value of Xp. The function fXp( ) is calculated, for example, by regression analysis with s being an explanatory variable and p being a target variable. The function fp( ) may be developed from the function fXp( ). The function fXp( ) is defined for each machine learning algorithm. The function fXp( ) defined for the machine learning algorithm a is denoted by a.fXp( ).

The function used to calculate the estimated runtime is denoted by ft( ). Because the estimated runtime depends on the sample size, it is represented by: $t^*=ft(s)$. The function ft( ) is a monotonically increasing function of sample size. For example, the following equation is applicable: $ft(s)=\beta_2+\alpha_2 \times s$, where $\alpha_2$, $\beta_2$, and s are coefficients determined by regression analysis with s being an explanatory variable and t being a target variable. The function ft( ) is defined for each machine learning algorithm. The function ft( ) defined for the machine learning algorithm a is denoted by a.ft( ). Note that the above-described symbols with an asterisk indicate that the values are estimates.

Figure 7:
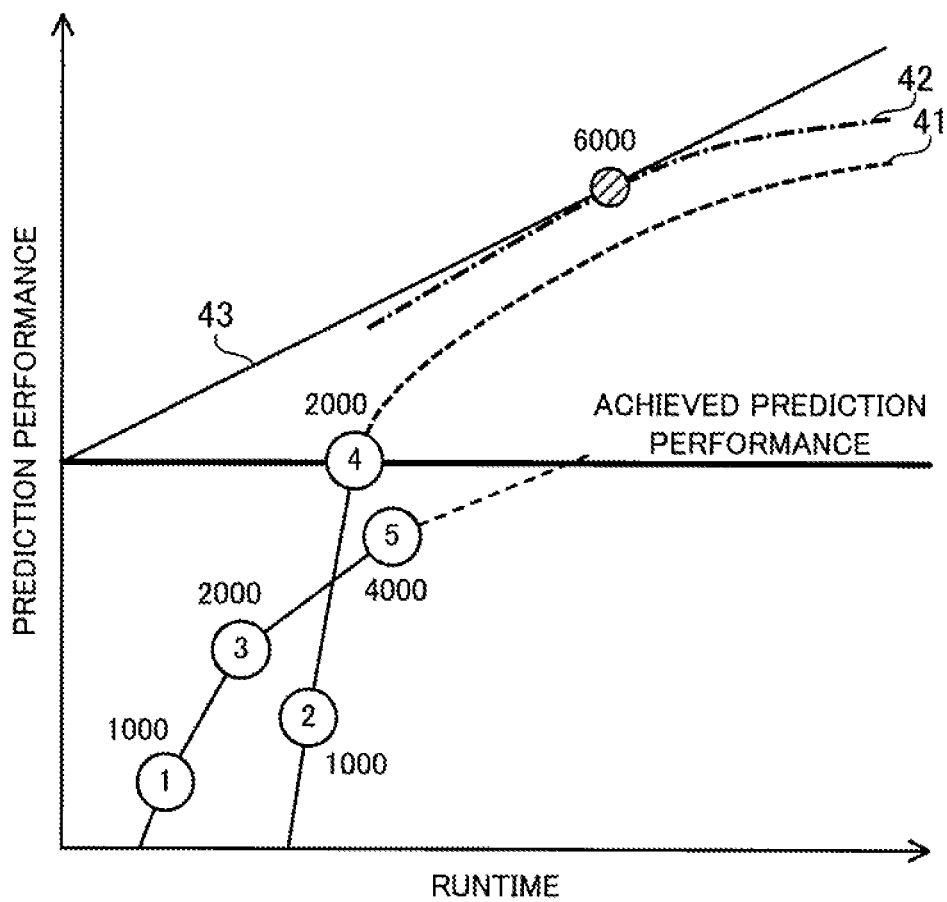
FIG. 7 is a first graph illustrating an example of dynamic sample size selection.

FIG. 7 is a first graph illustrating an example of dynamic sample size selection. Let us consider a case of determining the sample size for the machine learning algorithm #2 to be executed after the execution of the fifth learning step in FIG. 6. A curve 41 represents the relationship between the expected value of the prediction performance and the runtime of the machine learning algorithm #2, estimated based on the results of the second and fourth learning steps. A curve 42 represents the relationship between the UCB of the prediction performance and the runtime of the machine learning algorithm #2. A straight line 43 is a tangent to the curve 42, extending from a point at which the runtime equals to 0 and the prediction performance equals to the achieved prediction performance. The difference between a point on the curve 42 and the achieved prediction performance corresponds to the performance improvement amount. The slope of the straight line 43 corresponds to the maximum improvement rate. In the example of FIG. 7, the sample size achieving the prediction performance and the runtime at a tangent point between the curve 42 and the straight line 43 is 6000.

The machine learning device 100 selects, amongst sample sizes larger than the sample size used for the fourth learning step, a sample size achieving the maximum improvement rate as the sample size for the machine learning algorithm #2 to be executed next time. The maximum improvement rate corresponds to the slope of the straight line 43. Therefore, in the example of FIG. 7, a sample size of 6000 is selected. The machine learning device 100 makes trial calculations of the improvement rates for some sample sizes, for example, by numerical analysis to search for a sample size with the maximum improvement rate. The machine learning device 100 may use a binary search or the like to gradually narrow down the range containing a sample size yielding the maximum improvement rate. Note that the machine learning device 100 may limit sample size options to discrete values satisfying a fixed condition, for example, values in multiples of 1000.

As for a given machine learning algorithm a, the maximum sample size amongst sample sizes already used in the executions of the machine learning algorithm a is denoted by $s_0$, and the measured runtime of a learning step with the sample size $s_0$ is denoted by $t_0$. In addition, for the machine learning algorithm a, the sample size to be selected next is denoted by $s_2$ and the estimated runtime of a learning step with the sample size $s_2$ is denoted by $t_2^*$ and calculated as: $t_2^* = a.ft(s_2)$. The sample size $s_2$ is a sample size s that maximizes fg(a.fXp(s), P)/a.ft(s). Note however that the sample size $s_2$ satisfies the following constraints: $s_2 > s_0$ and $t_2^* \geq k_1 \times t_0$, where $k_1$ is a constant greater than or equal to 1 and, for example, $k_1 = 1.2$. If there is a time limit, the estimated runtime $t_2^*$ is preferably less than or equal to the remaining time.

As described above, the next sample size of each machine learning algorithm is in principle a sample size maximizing the improvement rate. Note however that the machine learning device 100 may make an adjustment to the next sample size of each machine learning algorithm in consideration of execution results of a different machine learning algorithm. That is, the machine learning device 100 may purposefully set the next sample size larger or smaller than the sample size maximizing the improvement rate.

Figure 8:
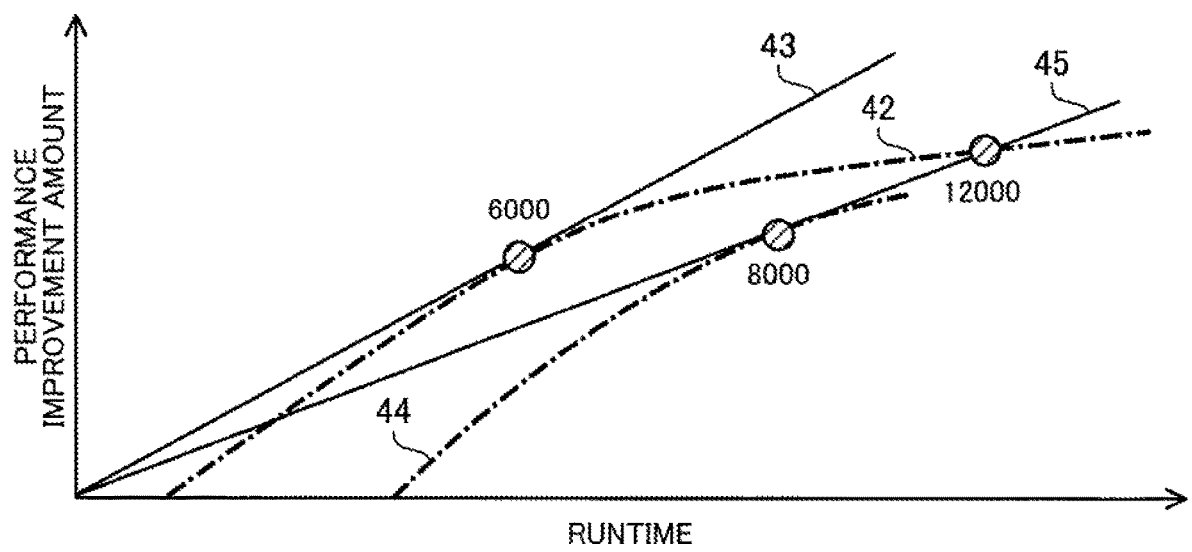
FIG. 8 is a second graph illustrating the example of dynamic sample size selection.

A case of setting the next sample size larger is described first. FIG. 8 is a second graph illustrating the example of dynamic sample size selection. The curve 42 of FIG. 8 represents the relationship between the UCB of the prediction performance and the runtime of the machine learning algorithm #2, as in FIG. 7. The straight line 43 is a tangent to the curve 42, extending from a point at which the runtime equals to 0 and the prediction performance equals to the achieved prediction performance, as in FIG. 7. The slope of the straight line 43 represents the maximum improvement rate of the machine learning algorithm #2. The sample size maximizing the improvement rate of the machine learning algorithm #2 is 6000. Note that the vertical axis of FIG. 8 represents prediction performance relative to the achieved prediction performance, i.e., the performance improvement amount.

A curve 44 represents the relationship between the UCB of the prediction performance and the runtime of a different machine learning algorithm (machine learning algorithm #3). A straight line 45 is a tangent to the curve 44, extending from a point at which the runtime equals to 0 and the prediction performance equals to the achieved prediction performance. The slope of the straight line 45 represents the maximum improvement rate of the machine learning algorithm #3. The sample size maximizing the improvement rate of the machine learning algorithm #3 is 8000.

Assume here that, amongst a plurality of machine learning algorithms, the machine learning algorithm #2 exhibits the highest maximum improvement rate (the slope of the straight line 43). In addition, assume that the machine learning algorithm #3 has the second-highest maximum improvement rate (the slope of the straight line 45) after the machine learning algorithm #2. In this case, even if the sample size of the machine learning algorithm #2 is made as large as up to the sample size corresponding to the intersection of the curve 42 and the straight line 45, there is no change in the situation where the machine learning algorithm #2 is executed in the next learning step. Assuming that the sample size corresponding to the intersection of the curve 42 and the straight line 45 is 12000, even if the machine learning algorithm #2 is executed with a sample size of 6000, it is likely to subsequently execute the machine learning algorithm #2 with a sample size of 12000.

In view of the above, in executing a machine learning algorithm, the machine learning device 100 increases the sample size in such a manner that the improvement rate of the machine learning algorithm will not fall below the second-highest maximum improvement rate of a different machine learning algorithm. This allows useless learning steps with small sample sizes to be skipped. The machine learning device 100 makes trial calculations of the improvement rates for some sample sizes, for example, by numerical analysis to search for a sample size satisfying the above-mentioned condition. The machine learning device 100 may use a binary search or the like to gradually narrow down the range containing a sample size satisfying the above-mentioned condition. Note that the machine learning device 100 may limit sample size options to discrete values satisfying a fixed condition, for example, values in multiples of 1000.

The machine learning algorithm with the maximum improvement rate amongst a plurality of machine learning algorithms is denoted by a; the sample size maximizing the improvement rate of the machine learning algorithm a is denoted by $s_2$; and the estimated runtime of a learning step with the sample size $s_2$ is denoted by $t_2^*$ and calculated as: $t_2^* = a.ft(s_2)$. In addition, the improvement rate of a machine learning algorithm with the second-highest improvement rate amongst the plurality of machine learning algorithms is denoted by $r_{sec}^*$. The increased sample size of the machine learning algorithm a is denoted by $s_3$. The sample size $s_3$ is the maximum sample size s satisfying fg(a.fXp(s), P)/a.ft(s)≥$r_{sec}$* and s≥$s_2$.

Note however that, if there is a time limit, estimated runtime $t_3$* for executing the machine learning algorithm a with the sample size $s_3$ is preferably less than or equal to the remaining time. The estimated runtime $t_3$* is calculated by: $t_3$*=a.ft($s_3$). In addition, the slope of fg(a.fXp(s), P), i.e., a value obtained by differentiating fg(a.fXp(s), P) with respect to a.ft(s) being greater than or equal to a predetermined positive constant may be added as a constraint condition. Alternatively, a.ft(s)≤$k_2$×$t_2$* may be added as a constraint condition, where $k_2$ is a constant greater than 1. This prevents the sample size from being excessively large.

Figure 9:
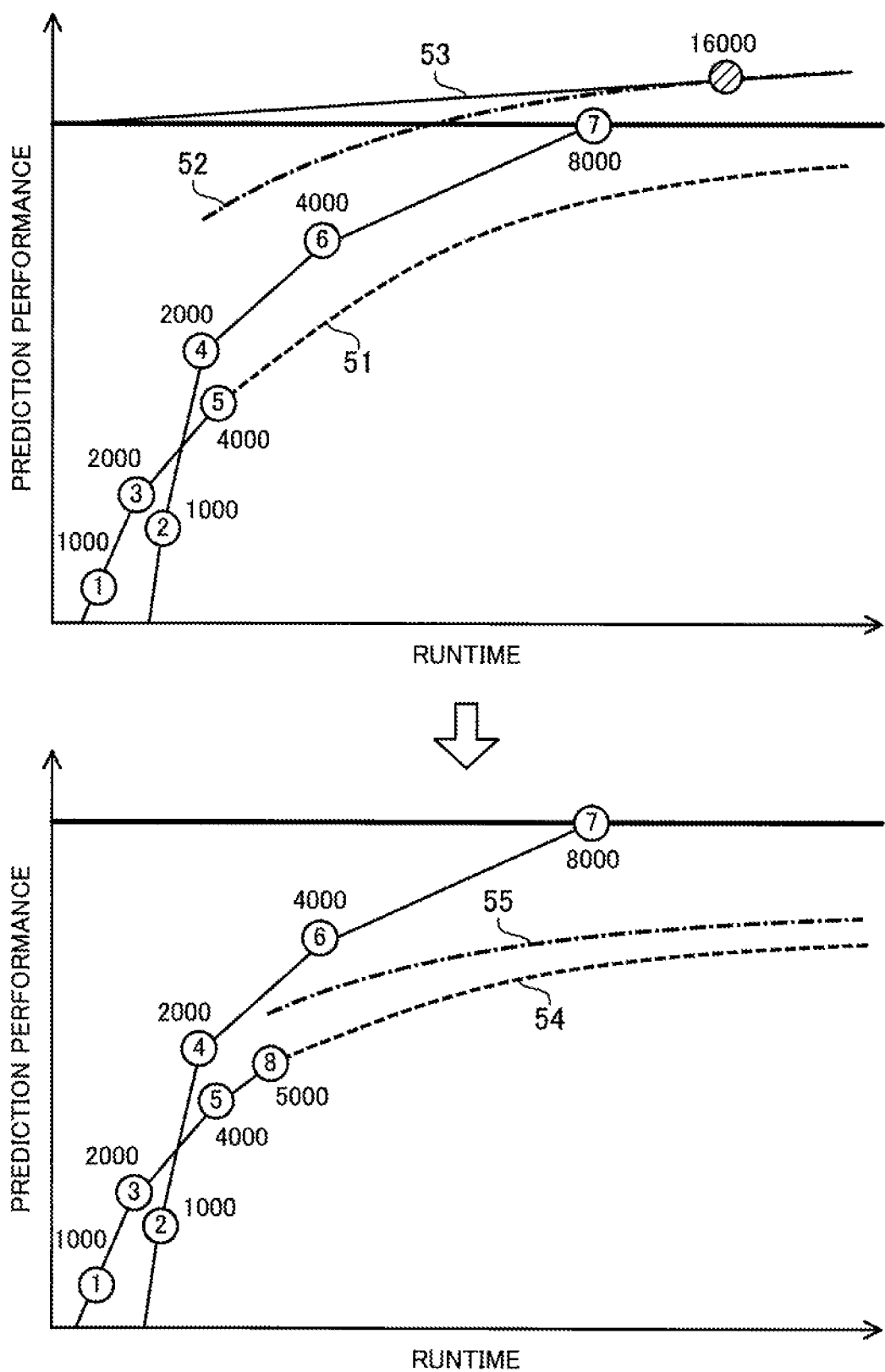
FIG. 9 is a third graph illustrating the example of dynamic sample size selection.

Next described is a case of setting the next sample size smaller. FIG. 9 is a third graph illustrating the example of dynamic sample size selection. Let us consider a case of determining the sample size for machine learning algorithm #1 to be executed after the execution of the seventh learning step in FIG. 6. A curve 51 represents the relationship between the expected value of the prediction performance and the runtime of the machine learning algorithm #1, estimated based on the results of the first, third, and fifth learning steps. A curve 52 represents the relationship between the UCB of the prediction performance and the runtime of the machine learning algorithm #1. A straight line 53 is a tangent to the curve 52, extending from a point at which the runtime equals to 0 and the prediction performance equals to the achieved prediction performance. The sample size corresponding to a tangent point between the curve 52 and the straight line 53 is 16000. That is, the maximum improvement rate is achieved with a sample size of 16000.

In the example of FIG. 9, there are only three values measured for the prediction performance of the machine learning algorithm #1. For this reason, the expected value of the prediction performance suffers from low estimation accuracy, leading to high variance in the prediction performance. As a result, at a sample size of 16000, although the expected value of the prediction performance falls below the current achieved prediction performance, the UCB of the prediction performance exceeds the current achieved prediction performance. In this situation, the possibility that the machine learning algorithm #1 will improve the achieved prediction performance may remain, and the machine learning algorithm #1 may therefore be executed with a sample size of 16000.

However, because there is also a high possibility of the machine learning algorithm #1 failing to improve the achieved prediction performance, executing the machine learning algorithm #1 with the large sample size taking long runtime carries a high risk. In view of this, when executing a machine learning algorithm with a sample size maximizing the improvement rate is relatively less likely to contribute to improving the achieved prediction performance, the machine learning device 100 executes the machine learning algorithm with a sample size smaller than the sample size maximizing the improvement rate. This contributes to an increase in the number of measurements of the prediction performance, which in turn improves estimation accuracy of the prediction performance of the machine learning algorithm with a large sample size. If, with the improved estimation accuracy, it becomes clear that the UCB of the prediction performance does not exceed the current achieved prediction performance, the machine learning algorithm will not be executed from this point forward.

For example, the machine learning device 100 executes, as the eighth learning step, the machine learning algorithm #1 with a sample size of 5000. As a result, curves 54 and 55 illustrated in FIG. 9 are obtained. The curve 54 represents the relationship between the expected value of the prediction performance and the runtime of the machine learning algorithm #1, estimated based on the results of the first, third, fifth, and eighth learning steps. The curve 55 represents the relationship between the UCB of the prediction performance and the runtime of the machine learning algorithm #1. As a result of the improved estimation accuracy, the expected value of the prediction performance represented by the curve 54 lies below the curve 51. In addition, low variance in the prediction performance is achieved, and the UCB of the prediction performance represented by the curve 55 is significantly lower than the curve 52. In this case, the machine learning device 100 need not execute the machine learning algorithm #1 with a sample size of 16000.

As for a given machine learning algorithm a, the maximum sample size amongst sample sizes already used in the executions of the machine learning algorithm a is denoted by $s_0$; the measured runtime of a learning step with the sample size $s_0$ is denoted by $t_0$; the measured prediction performance of the learning step with the sample size $s_0$ is denoted by $p_0$; and the end time of the learning step with the sample size $s_0$ is denoted by T. In addition, for the machine learning algorithm a, the sample size maximizing the improvement rate is denoted by $s_2$; the estimated runtime of a learning step with the sample size $s_2$ is denoted by $t_2$* and calculated as: $t_2$*=a.ft($s_2$); and the estimated prediction performance of the learning step with the sample size $s_2$ is denoted by $p_2$* and calculated as: $p_2$*=a.fp($s_2$). The reduced sample size of the machine learning algorithm a is denoted by $s_1$; the estimated runtime of a learning step with the sample size $s_1$ is denoted by $t_1$* and calculated as: $t_1$*=a.ft($s_1$); and the estimated prediction performance of the learning step with the sample size $s_1$ is denoted by $p_1$* and calculated as: $p_1$*=a.fp($s_1$).

Figure 10:
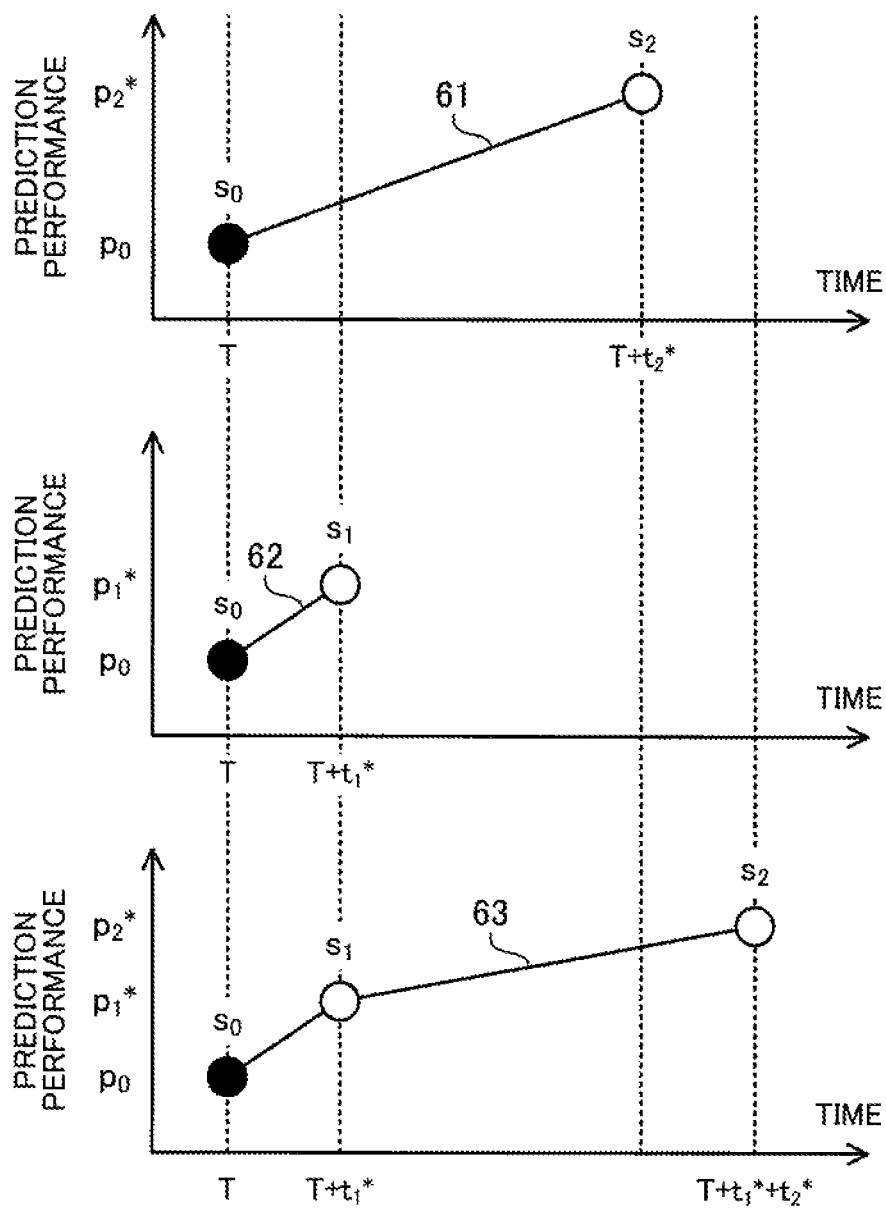
FIG. 10 illustrates scenario examples associated with a decrease in the sample size.

The machine learning device 100 determines, in the following manner, whether to execute the machine algorithm a with the sample size $s_1$ before using the sample size $s_2$. FIG. 10 illustrates scenario examples associated with a decrease in the sample size. The machine learning device 100 determines, in terms of the learning time, whether it is advantageous to execute the machine learning algorithm a with the sample size $s_1$ or $s_2$. In this regard, three scenarios are conceivable based on a sample size selection method and execution results of the machine learning algorithm a. A curve 61 illustrates the relationship between the prediction performance and time in the first scenario. The first scenario is a case of selecting not the sample size $s_1$, but the sample size $s_2$, after the learning step with the sample size $s_0$ ends at the time T. At time T+$t_2$*, the learning step with the sample size $s_2$ ends and the prediction performance $p_2$* is obtained.

A curve 62 illustrates the relationship between the prediction performance and time in the second scenario. The second scenario is a case of selecting, after the learning step with the sample size $s_0$ ends at the time T, the sample size $s_1$, which then yields low prediction performance $p_1$*. At time T+$t_1$*, the learning step with the sample size $s_1$ ends and the learning step with the sample size $s_2$ is not executed. That is, the execution of the machine learning algorithm a is discontinued. A curve 63 illustrates the relationship between the prediction performance and time in the third scenario. The third scenario is a case of selecting, after the learning step with the sample size $s_0$ ends at the time T, the sample size $s_1$, which then yields high prediction performance $p_1$*.

At time $T+t_1^*$, the learning step with the sample size $s_1$ ends and the learning step with the sample size $s_2$ subsequently starts. Then, at time $T+t_1^*+t_2^*$, the learning step with the sample size $s_2$ ends and the prediction performance $p_2^*$ is obtained.

When the machine learning device 100 has selected the sample size $s_2$, the first scenario occurs. On the other hand, when the machine learning device 100 has selected the sample size $s_1$, one of the second scenario and the third scenario occurs stochastically. While the accumulated runtime of the second scenario is shorter than that of the first scenario, the accumulated runtime of the third scenario is longer than that of the first scenario. Therefore, the desirability of selecting either the sample size $s_1$ or $s_2$ to shorten the accumulated runtime depends on the probability of the second scenario occurring.

Note that the probability of the second scenario occurring after the sample size $s_1$ is selected (discontinuation probability of the machine learning algorithm a) is denoted by $P_{stop}$, while the probability of the third scenario occurring after the sample size $s_1$ is selected is denoted by $1-P_{stop}$. How to calculate the discontinuation probability $P_{stop}$ is described below. When the expected value of the runtime spent on the machine learning algorithm a after the time T is denoted by $t_{12}^*$, the following equation is obtained: $t_{12}^*=P_{stop} \times t_1^*+(1-P_{stop}) \times (t_1^*+t_2^*)$. This equation may be changed to: $t_{12}^*=t_1^*+(1-P_{stop}) \times t_2^*$. If $t_{12}^*<t_2^*$ is true, the runtime is expected to be shortened by selecting the sample size $s_1$. Therefore, a condition for the machine learning device 100 to select the sample size $s_1$ is that the sample size $s_1$ satisfying $t_1^*<P_{stop} \times t_2^*$ meets the following inequality: $s_0<s_1<s_2$. The best suited sample size $s_1$ is a sample size minimizing $t_{12}^*$, i.e., $a.ft(s)+(1-P_{stop}) \times t_2^*$. Note however that the following constraints need to be satisfied: $s_0<s_1<s_2$ and $t_1^* \geq k_1 \times t_0$. Note that the discontinuation probability $P_{stop}$ varies with the sample size $s_1$.

Figure 11:
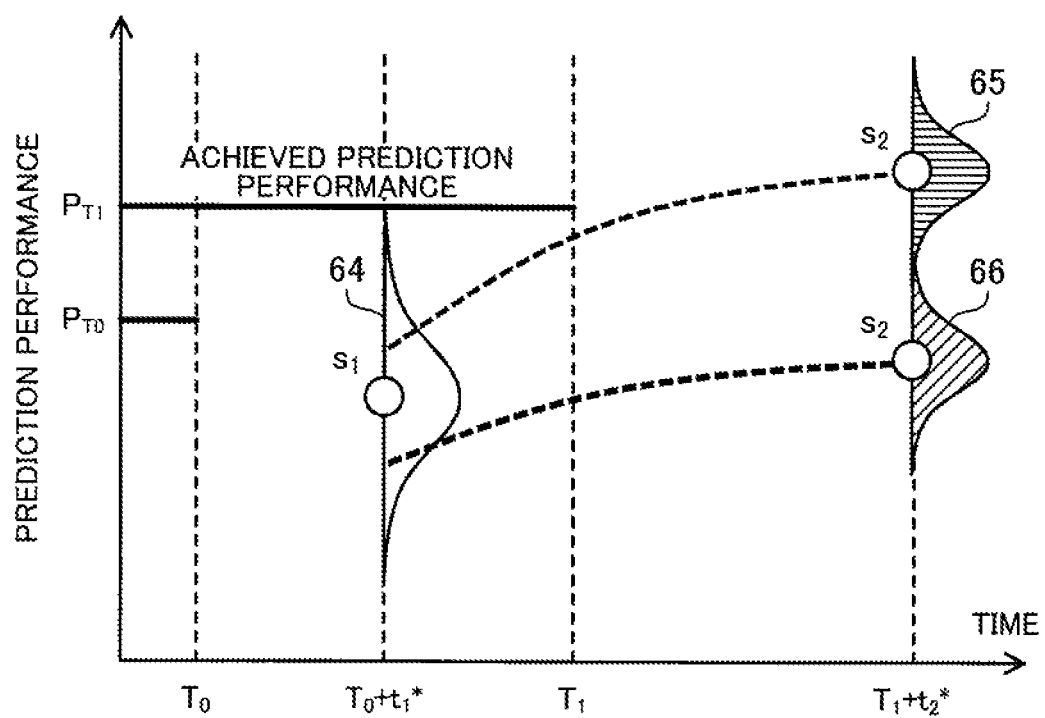
FIG. 11 illustrates an example of calculating discontinuation probability.

FIG. 11 illustrates an example of calculating the discontinuation probability. The discontinuation probability $P_{stop}$ is obtained in the following manner. Let us consider a case in which the machine learning device 100 starts executing the machine learning algorithm a with the sample size $s_1$ at time $T_0$. The achieved prediction performance at the time $T_0$ is $P_{T0}$. The estimated runtime of a learning step with the sample size $s_1$ is calculated by: $t_1^*=a.ft(s_1)$. Assume here that the learning step with the sample size $s_1$ ends at time $T_0+t_1^*$ as estimated. A probability distribution 64 is the probability distribution $a.fXp(s_1)$ of the prediction performance, obtained by the learning step with the sample size $s_1$. A random variable with the probability distribution $a.fXp(s_1)$ is denoted by $p_x$. In addition, let us consider a case in which the machine learning device 100 starts executing the machine learning algorithm a with the sample size $s_2$ at time $T_1$ after the time $T_0+t_1^*$. A different machine learning algorithm may be executed between the times $T_0+t_1^*$ and $T_1$. The achieved prediction performance at the time $T_1$ is $P_{T1}$. The estimated runtime of a learning step with the sample size $s_2$ is calculated by: $t_2^*=a.ft(s_2)$. Assume here that the learning step with the sample size $s_2$ ends at time $T_1+t_2^*$ as estimated.

In this situation, the machine learning device 100 runs the following simulation. Assume that the machine learning device 100 has achieved prediction performance $p_x$ as a result of executing the learning step with the sample size $s_1$. By comparing $p_x$ with $P_{T0}$, the machine learning device 100 determines that the achieved prediction performance is updated to $p_x$ at the time $T_0+t_1^*$ if $p_x > P_{T0}$. In the case where the achieved prediction performance is updated, the machine learning device 100 virtually updates the improvement rate of each machine learning algorithm. In addition, the machine learning device 100 virtually updates the equation for estimating the prediction performance of the machine learning algorithm a using the measured prediction performance $p_x$, and recalculates the estimated prediction performance $a.fp(s_2)$ and the probability distribution $a.fXp(s_2)$ of a learning step with the sample size $s_2$.

A probability distribution 65 is the probability distribution $a.fXp(s_2)$ calculated assuming that $p_x$ is a single prediction performance measurement greater than the expected value of the probability distribution 64. A probability distribution 66 is the probability distribution $a.fXp(s_2)$ calculated assuming that $p_x$ is a single prediction performance measurement less than the expected value of the probability distribution 64. In this manner, after selecting the sample size $s_1$, the machine learning device 100 calculates the improvement rate of the machine learning algorithm a in the case of further selecting the sample size $s_2$. The improvement rate calculated here is denoted by $r_2^*$.

The machine learning device 100 determines whether, at the time $T_0+t_{1*}$, the improvement rate $r_2^*$ is higher than that of any other machine learning algorithm and also greater than or equal to a threshold R, and whether the estimated runtime $t_2^*$ is less than or equal to the remaining time. When these conditions are met, the machine learning device 100 determines to execute the machine learning algorithm a with the sample size $s_2$. When, at the time $T_0+t_1^*$, there is a different machine learning algorithm whose improvement rate is higher than $r_2^*$, the machine learning device 100 calculates the achieved prediction performance $P_{T1}$ assuming that the different machine learning algorithm is able to achieve the prediction performance as expected. Based on the achieved prediction performance $P_{T1}$, the machine learning device 100 updates the improvement rate $r_2^*$. Then, the machine learning device 100 determines whether, at the time $T_1$, the updated improvement rate $r_2^*$ is greater than or equal to the threshold R and whether the estimated runtime $t_2^*$ is less than or equal to the remaining time. If these conditions are met, the machine learning device 100 determines to execute the machine learning algorithm a with the sample size $s_2$. If not, the machine learning device 100 determines not to execute the machine learning algorithm a with the sample size $s_2$ (i.e., determines to discontinue the execution of the machine learning algorithm a).

The machine learning device 100 randomly selects a value from a number of possible values of the random variable $p_x$ with the probability distribution 64 each time by the Monte Carlo method and repeats the above-described processing. Herewith, the discontinuation probability $P_{stop}$ is calculated by the following equation (1).

$$P_{stop} = \int_{-\infty}^{\infty} f(x)h(x)dx \quad (1)$$

where $f(x)$ is the probability density function of the probability distribution 64 and $h(x)$ is the function that takes a value of 0 in the case of executing the machine learning algorithm a with the sample size $s_2$ and that takes a value of 1 in the case of not executing the machine learning algorithm a with the sample size $s_2$.

The above discontinuation probability $P_{stop}$ changes with a change in the sample size $s_1$. In the case of searching for the best suited sample size $s_1$ by the method illustrated in FIG. 10, the machine learning device 100 repeats the simulation described in FIG. 11 using various sample sizes $s_1$. The machine learning device 100 may use a binary search or the like to gradually narrow down the range containing the best suited sample size $s_1$. In addition, the machine learning device 100 may limit options for the sample size $s_1$ to discrete values satisfying a fixed condition, for example, values in multiples of 1000.

Figure 12:
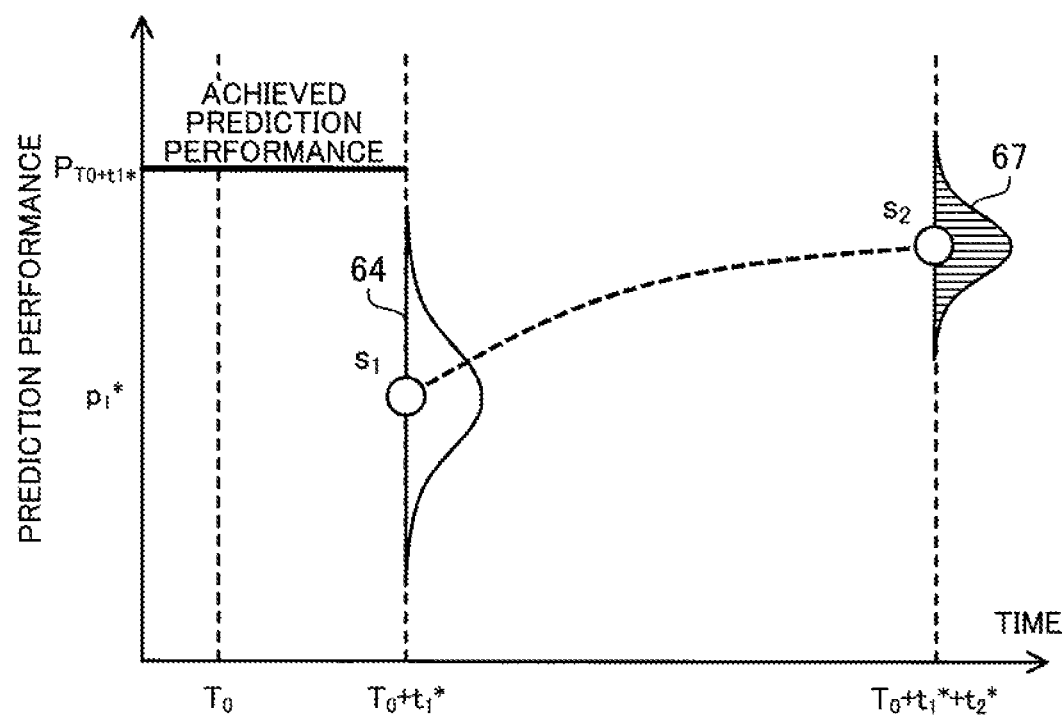
FIG. 12 illustrates another example of calculating the discontinuation probability.

Note that the discontinuation probability $P_{stop}$ may be approximated by a simpler method than the above-described method. FIG. 12 illustrates another example of calculating the discontinuation probability. Assume that the machine learning device 100 starts executing the machine learning algorithm a with the sample size $s_1$ at time $T_0$, as in the example of FIG. 11. The achieved prediction performance at the time $T_0$ is $P_{T0}$. The learning step with the sample size $s_1$ ends at the time $T_0+t_1{}^*$. The probability distribution 64 is the probability distribution $a.fXp(s_1)$ of the prediction performance, obtained by the learning step with the sample size $s_1$. The expected value of the prediction performance associated with the sample size $s_1$ is calculated by: $p_1{}^*=a.fp(s_1)$. The achieved prediction performance at the time $T_0+t_1{}^*$ is $P_{T0+t1}{}^*$.

Assume that the machine learning device 100 subsequently starts executing the machine learning algorithm a with the sample size $s_2$ at the time $T_0+t_1{}^*$, unlike in the case illustrated in FIG. 11. That is, no other machine learning algorithms are considered. The learning step with the sample size $s_2$ ends at time $T_0+t_1{}^*+t_2{}^*$. A probability distribution 67 is the probability distribution $a.fXp(s_2)$ of the prediction performance, obtained by the learning step with the sample size $s_2$. The probability distribution 67 is estimated assuming that the prediction performance obtained by the learning step with the sample size $s_1$ is the expected value $p_1{}^*$.

The discontinuation probability is $P_{stop}$ is approximated by the following equation (2).

$$P_{stop}=\tfrac{1}{2}\!\int_{-\infty}^{P_{T0+t1}{}^*}\!f(x)dx \qquad (2)$$

where $f(x)$ is the probability density function of the probability distribution 67 and the achieved prediction performance $P_{T0+t1*}$ is $\max(P_{T0}, p_1{}^*)$. That is, it is assumed that, only when the expected value of the prediction performance obtained with the sample size $s_1$ is higher than the achieved prediction performance measured at the time $T_0$, the achieved prediction performance is updated. Because the expected value $p_1{}^*$ depends on the sample size $s_1$, the discontinuation probability $P_{stop}$ varies with a change in the sample size $s_1$.

In the case where the lower limit of the prediction performance indicated by the probability distribution 67 is sufficiently higher than the achieved prediction performance $P_{T0+t1*}$, the machine learning device 100 is likely to execute the learning step with the sample size $s_2$, and the discontinuation probability $P_{stop}$ is therefore close to 0. On the other hand, in the case where the upper limit of the prediction performance indicated by the probability distribution 67 is slightly higher than the achieved prediction performance $P_{T0+t1*}$, if the prediction performance with the sample size $s_1$ is lower than the expected value $p_1{}^*$, it is likely that the UCB of the prediction performance will not exceed the achieved prediction performance $P_{T0+t1*}$ and the machine learning device 100 therefore will not execute a learning step with the sample size $s_2$. In this case, the discontinuation probability $P_{stop}$ approximates 0.5.

Further, it is possible to approximate the sample size $s_1$ by an even simpler method. Assume here that the achieved prediction performance $P_{T0+t1*}$ at the time $T_0+t_1{}^*$ is constant, not depending on the sample size $s_1$. Assuming, for example, that $P_{T0+t1*}=P_{T0}$, the above-mentioned $t_{12}{}^*$ monotonically increases with the sample size $s_1$. The machine learning device 100 obtains the sample size $s_1$ satisfying $t_{12}{}^*=k_1 \times t_0=a.ft(s_1)$. In this case, if $s_0<s_1<s_2$ and $t_1{}^*<P_{stop}\times t_2{}^*$ are true, the machine learning device 100 selects the sample size $s_1$.

In the above-described manner, the machine learning device 100 determines a machine learning algorithm and a sample size to be used in the next learning step each time one learning step is completed. The machine learning device 100 may present the progress of learning steps on the display 111. FIG. 13 illustrates an example of a machine learning progress screen. The machine learning device 100 presents a machine learning progress screen 115 on the display 111 during the progress of the machine learning. The machine learning progress screen 115 lists, for each of one or more executed learning steps, its step number, identification information of a machine learning algorithm, sample size, and achieved prediction performance. Note that the machine learning device 100 may output information corresponding to the machine learning progress screen 115 from an output device other than the display 111. Alternatively, the machine learning device 100 may transmit information corresponding to the machine learning progress screen 115 to a different device.

Figure 14:
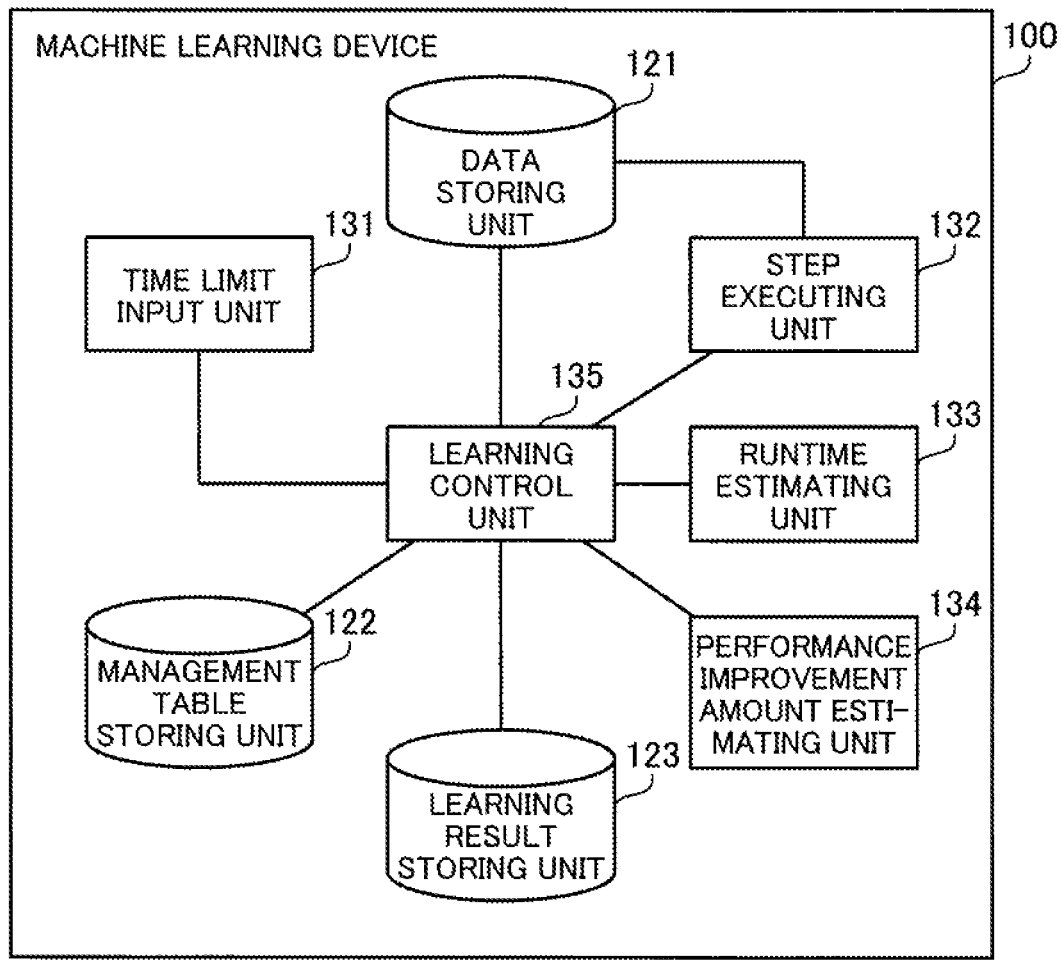
FIG. 14 is a block diagram illustrating an example of functions of the machine learning device.

Next described are functions and processes of the machine learning device 100. FIG. 14 is a block diagram illustrating an example of functions of the machine learning device. The machine learning device 100 includes a data storing unit 121, a management table storing unit 122, a learning result storing unit 123, a time limit input unit 131, a step executing unit 132, a runtime estimating unit 133, a performance improvement amount estimating unit 134, and a learning control unit 135. The data storing unit 121, the management table storing unit 122, and the learning result storing unit 123 are implemented, for example, using a storage area secured in the RAM 102 or the HDD 103. The time limit input unit 131, the step executing unit 132, the runtime estimating unit 133, the performance improvement amount estimating unit 134, and the learning control unit 135 are implemented, for example, using program modules executed by the CPU 101.

The data storing unit 121 stores therein a data set available for machine learning. The data set is a collection of unit data elements each including a target variable value (an effect) and one or two or more explanatory variable values (causes). The data stored in the data storing unit 121 may be originally collected by the machine learning device 100 and/or different information processors from various types of devices, or input by users to the machine learning device 100 and/or different information processors. The management table storing unit 122 stores therein tables used to manage the progress of machine learning. Details of the tables stored in the management table storing unit 122 are described later. The learning result storing unit 123 stores therein final results of machine learning. The final results of machine learning include models each indicating the relationship between a target variable and one or two or more explanatory variables. For example, coefficients each representing the weight of an explanatory variable are determined by machine learning. In addition, the final results of machine learning include records of the prediction performance of the learned models. Further, the final results of machine learning include information on machine learning algorithms and sample sizes used to learn each model.

The time limit input unit 131 acquires information on the time limit for machine learning and notifies the learning control unit 135 of the time limit. The time limit information may be input by the user through the input device 112. Alternatively, the time limit information may be read from a configuration file stored in the RAM 102 or the HDD 103. Further, the time limit information may be received from a different information processor via the network 114.

The step executing unit 132 is able to execute a plurality of machine learning algorithms. The step executing unit 132 receives, from the learning control unit 135, a designation of a machine learning algorithm and a sample size. Then, using the data stored in the data storing unit 121, the step executing unit 132 executes a learning step using the designated machine learning algorithm with the designated sample size. That is, based on the designated sample size, the step executing unit 132 extracts a training dataset and a testing dataset from the data storing unit 121. The step executing unit 132 learns a model using the training dataset and the designated machine learning algorithm, and then calculates the prediction performance using the testing dataset. As for the model learning and the prediction performance calculation, the step executing unit 132 is able to use various types of validation techniques, such as cross-validation and random subsampling validation. A validation technique to be used may be set in advance in the step executing unit 132. In addition, the step executing unit 132 measures the runtime of each learning step. The step executing unit 132 outputs the model, the prediction performance, and the runtime to the learning control unit 135.

The runtime estimating unit 133 estimates the runtime of a combination of a machine learning algorithm and a sample size. The runtime estimating unit 133 receives a designation of a machine learning algorithm and a sample size from the learning control unit 135. In response, the runtime estimating unit 133 estimates the runtime of a learning step with the designated sample size based on runtimes of the designated machine learning algorithm measured up to this point, the designated sample size, and a predetermined estimate equation. The runtime estimating unit 133 outputs the estimated runtime to the learning control unit 135.

The performance improvement amount estimating unit 134 estimates the performance improvement amount associated with a combination of a machine learning algorithm and a sample size. The performance improvement amount estimating unit 134 receives a designation of a machine learning algorithm and a sample size from the learning control unit 135. In response, the performance improvement amount estimating unit 134 estimates the prediction performance of a learning step with the designated sample size based on prediction performance records of the designated machine learning algorithm obtained up to this point, the designated sample size, and a predetermined estimate equation. In this regard, the performance improvement amount estimating unit 134 uses a value larger than the expected value of the prediction performance, such as the UCB, in consideration of statistical errors. The performance improvement amount estimating unit 134 calculates the performance improvement amount in relation to the current achieved prediction performance, and outputs the calculated performance improvement amount to the learning control unit 135.

The learning control unit 135 controls machine learning using a plurality of machine learning algorithms. The learning control unit 135 causes the step executing unit 132 to execute each of the plurality of machine learning algorithms with a small sample size. Each time a single learning step is executed, the learning control unit 135 determines a sample size to be used next for the same machine learning algorithm. The sample size to be used next is one maximizing the improvement rate. The learning control unit 135 causes the runtime estimating unit 133 to estimate the runtime of a learning step using the machine learning algorithm with the determined sample size, and also causes the performance improvement amount estimating unit 134 to estimate the performance improvement amount, to thereby calculate the improvement rate achieved when the machine learning algorithm is executed next time. When the achieved prediction performance is improved as a result of the execution of a learning step, the learning control unit 135 updates the improvement rates of other machine learning algorithms.

Then, the learning control unit 135 selects, amongst the plurality of machine learning algorithms, one with the maximum improvement rate and causes the step executing unit 132 to execute the selected machine learning algorithm. In this regard, the learning control unit 135 may cause the step executing unit 132 to execute the selected machine learning algorithm with a sample size smaller than a scheduled sample size. Alternatively, the learning control unit 135 may cause the step executing unit 132 to execute the selected machine learning algorithm with a sample size larger than a scheduled sample size. The learning control unit 135 repeats updating the improvement rates and selecting a machine learning algorithm until sufficiently low improvement rates are observed or the learning time exceeds the time limit.

The learning control unit 135 stores, amongst models obtained by the cessation of the machine learning, one with the maximum prediction performance in the learning result storing unit 123. In addition, the learning control unit 135 stores, in the learning result storing unit 123, the prediction performance, information on the machine learning algorithm, and information on the sample size. Note that, during the machine learning, the learning control unit 135 may output information on the progress in a timely manner, for example, by presenting the machine learning progress screen 115 on the display 111.

FIG. 15 illustrates an example of a history table, a function table, and a schedule table. A history table 124 is stored in the management table storing unit 122. The history table 124 includes columns of the following items: algorithm identifier (ID); sample size; prediction performance; and runtime. Each record in the history table 124 corresponds to a single executed learning step. Each field in the algorithm identifier column contains the identifier of a corresponding executed machine learning algorithm. Each field in the sample size column contains the sample size of a training dataset used in the corresponding learning step. Each field in the prediction performance column contains the measured prediction performance obtained in the corresponding learning step. Each field in the runtime column contains the measured runtime obtained in the corresponding learning step.

Amongst the prediction performance entries registered in the history table 124, the maximum prediction performance corresponds to the current achieved prediction performance. The history table 124 is updated by the learning control unit 135, for example, based on learning step execution results output by the step executing unit 132. The content of the history table 124 is referred to by the runtime estimating unit 133 and the performance improvement amount estimating unit 134.

A function table 125 is stored in the management table storing unit 122. The function table 125 includes columns of the following items: algorithm identifier (ID); prediction performance function; probability distribution function; and runtime function. Each record in the function table 125 corresponds to a single machine learning algorithm. Each field in the algorithm identifier column contains the identifier of a corresponding machine learning algorithm. Each field in the prediction performance function column contains the function fp( ) calculated for the corresponding machine learning algorithm, that is, the function used to obtain estimated prediction performance of the machine learning algorithm. Each field in the probability distribution function column contains the function fXp( ) calculated for the corresponding machine learning algorithm, that is, the function used to obtain the probability distribution of the prediction performance of the machine learning algorithm. Each field in the runtime function column contains the function ft( ) calculated for the corresponding machine learning algorithm, that is, the function used to obtain an estimated runtime of the machine learning algorithm.

The prediction performance function, probability distribution function, and runtime function of a machine learning algorithm are updated each time the number of the measured prediction performance records or the measured runtimes of the machine learning algorithm increases, that is, each time a learning step of the machine learning algorithm is executed. The function table 125 is updated, for example, by the runtime estimating unit 133 and the performance improvement amount estimating unit 134. In addition, the function table 125 is referred to by the runtime estimating unit 133, the performance improvement amount estimating unit 134, and the learning control unit 135.

A schedule table 126 is stored in the management table storing unit 122. The schedule table 126 includes columns of the following items: algorithm identifier (ID); sample size; and improvement rate. Each record in the schedule table 126 corresponds to a single machine learning algorithm. Each field in the algorithm identifier column contains the identifier of a corresponding machine learning algorithm. Each field in the sample size column contains the sample size to be used next time for the corresponding machine learning algorithm. Each field in the improvement rate column contains the improvement rate of the prediction performance, expected when the corresponding machine learning algorithm is executed with the corresponding sample size.

A machine learning algorithm with the maximum improvement rate is selected from the schedule table 126 and then executed. Each of the improvement rates in the schedule table 126 is updated each time the achieved prediction performance is improved as a result of the execution of a learning step. The initial value of each improvement rate is infinite. On the other hand, each sample size in the schedule table 126 is updated when its corresponding machine learning algorithm is executed, but it is not updated when the achieved prediction performance is improved by a different machine learning algorithm. The initial value of each sample size is, for example, 1/1024 the size of the data set D. The schedule table 126 is updated by the learning control unit 135 based on information output from the runtime estimating unit 133 and the performance improvement amount estimating unit 134.

Figure 16:
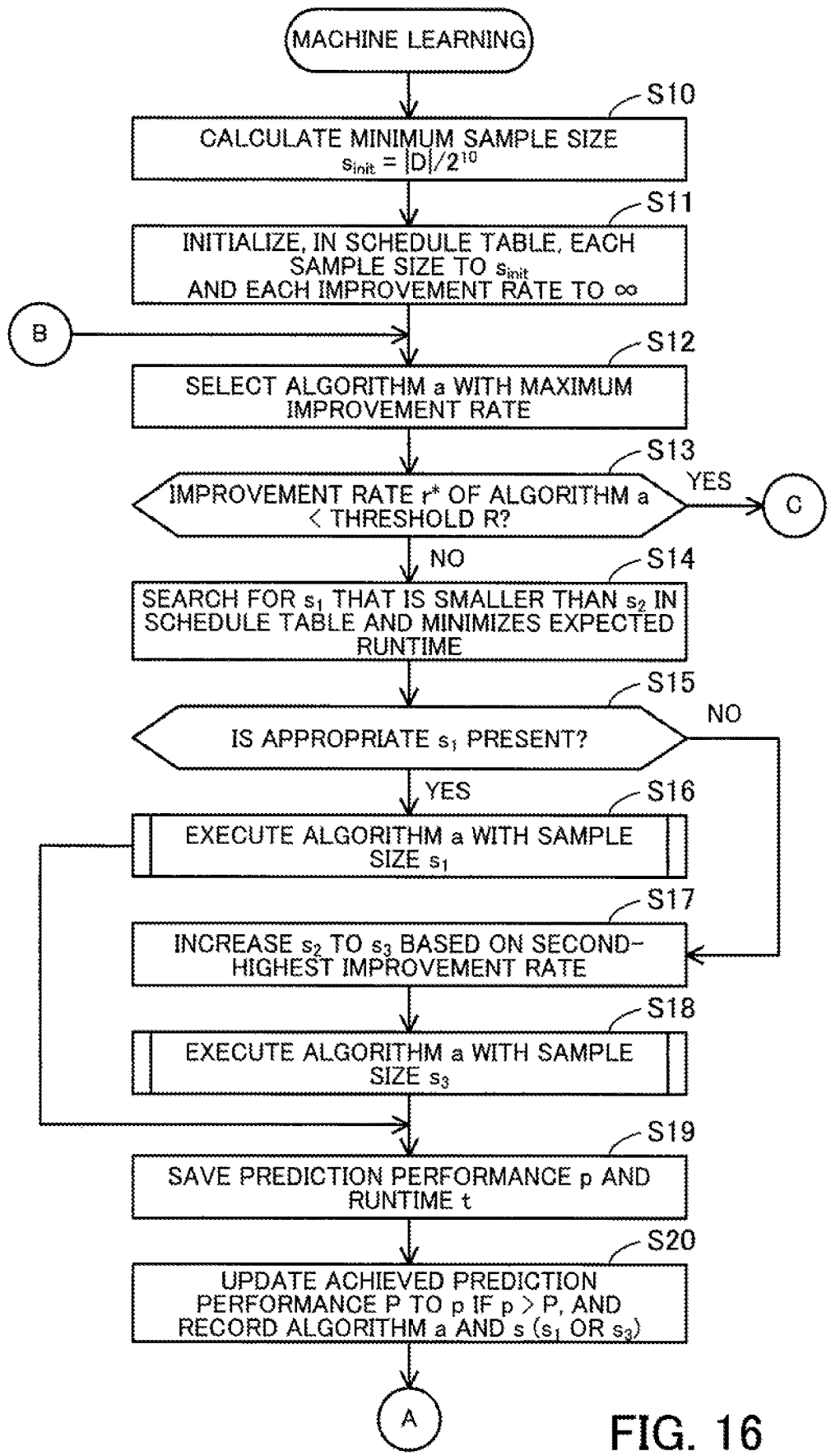
FIG. 16 is a flowchart illustrating an example of a machine learning procedure.

FIG. 16 is a flowchart illustrating an example of a machine learning procedure.

[Step S10] The learning control unit 135 calculates a minimum sample size $s_{init}$ by referring to the data storing unit 121. For example, the learning control unit 135 calculates $s_{init}=|D|/2^{10}$ based on the size of the data set D stored in the data storing unit 121.

[Step S11] The learning control unit 135 initializes the sample size of each of a plurality of machine learning algorithms registered in the schedule table 126 to $s_{init}$, and also initializes the improvement rate of each of the machine learning algorithms to infinity (∞). In addition, the learning control unit 135 initializes the achieved prediction performance P to an infinitesimal value.

[Step S12] The learning control unit 135 selects, from the schedule table 126, a machine learning algorithm with the highest improvement rate. The machine learning algorithm selected here is denoted by a.

[Step S13] The learning control unit 135 determines whether the improvement rate r* of the machine learning algorithm a is below the threshold R. The threshold R may be set in advance by the learning control unit 135. For example, R=0.001/3600. If the improvement rate r* is below the threshold R, the processing moves to step S31. If not, the processing moves to step S14.

[Step S14] The learning control unit 135 acquires, from the schedule table 126, the sample size corresponding to the machine learning algorithm a as the sample size $s_2$. Then, by the above-described method, the learning control unit 135 searches for the sample size $s_1$ which is smaller than the sample size $s_2$ and minimizes the expected runtime $t_{12}$*.

[Step S15] The learning control unit 135 determines whether such a sample size $s_1$ in step S14 is present. If the sample size $s_1$ is present, the processing moves to step S16. If not, the processing moves to step S17.

[Step S16] The learning control unit 135 causes the step executing unit 132 to execute a learning step using the machine learning algorithm a with the sample size $s_1$. The process of the step executing unit 132 is described later. Then, the processing moves to step S19.

[Step S17] The learning control unit 135 searches the schedule table 126 for a machine learning algorithm with the second-highest improvement rate after the machine learning algorithm a, and acquires the improvement rate. By the above-described method, the learning control unit 135 increases the sample size $s_2$ to the sample size $s_3$ based on the second-highest improvement rate. That is, the learning control unit 135 increases the sample size of the machine learning algorithm a in such a manner that the improvement rate of the machine learning algorithm a will not fall below the second-highest improvement rate.

[Step S18] The learning control unit 135 causes the step executing unit 132 to execute a learning step using the machine learning algorithm a with the sample size $s_3$.

[Step S19] The learning control unit 135 acquires, from the step executing unit 132, a learned model m as well as the prediction performance p and the runtime t of the learned model m. The learning control unit 135 saves, in the history table 124, the prediction performance p and the runtime t in association with the machine learning algorithm a and the sample size s ($s_1$ or $s_3$).

[Step S20] The learning control unit 135 determines whether the prediction performance p acquired in step S19 is higher than the achieved prediction performance P. If the prediction performance p is higher than the achieved prediction performance P, the learning control unit 135 updates the achieved prediction performance P to the prediction performance p, and also records the machine learning algorithm a and the sample size s ($s_1$ or $s_3$) having yielded the achieved prediction performance P.

Figure 17:
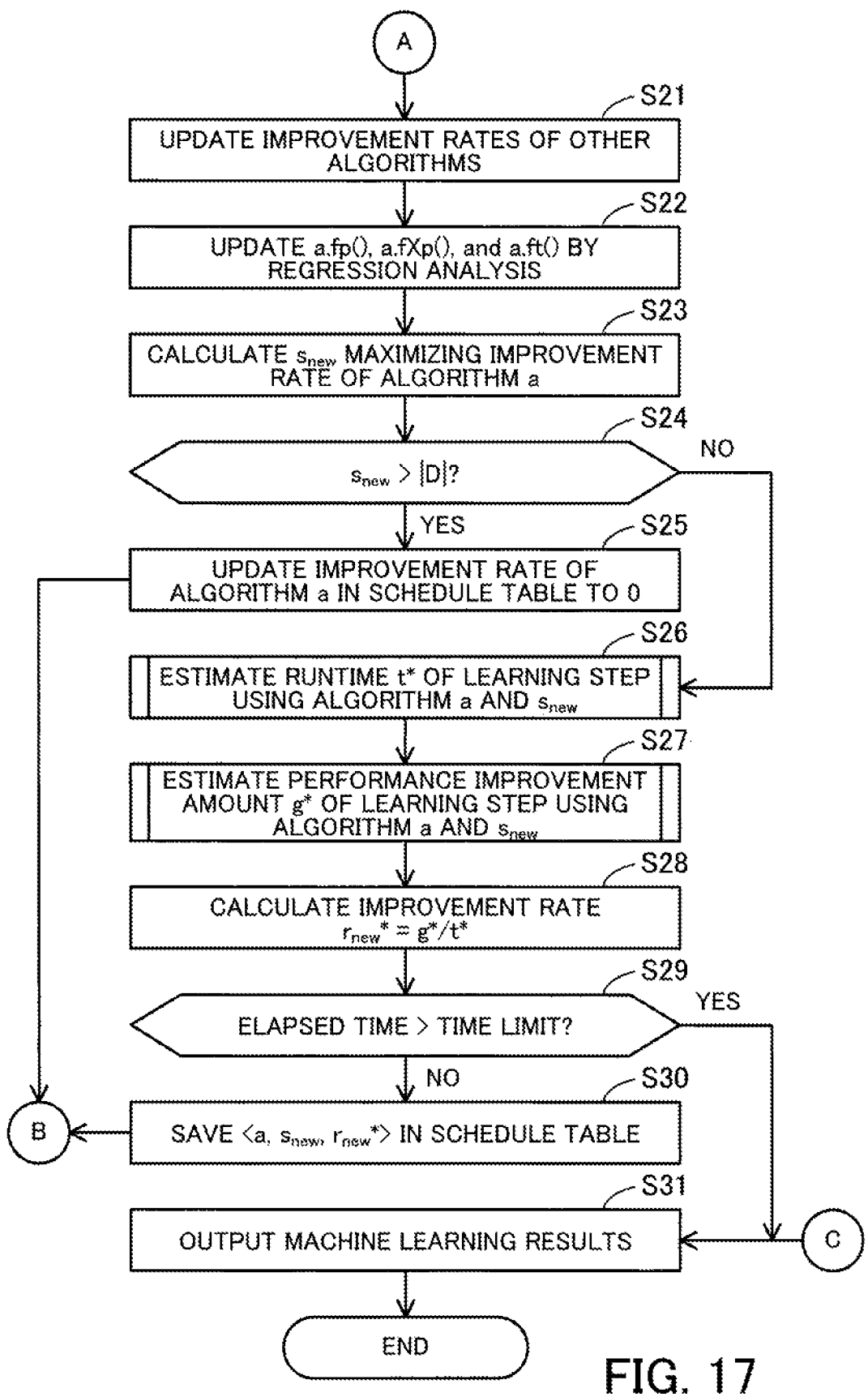
FIG. 17 is a flowchart illustrating the example of the machine learning procedure, continued from FIG. 16.

FIG. 17 is a flowchart illustrating the example of the machine learning procedure, continued from FIG. 16.

[Step S21] If the achieved prediction performance P is updated in step S20, the learning control unit 135 updates, within the schedule table 126, the improvement rate of each of the machine learning algorithms other than the machine learning algorithm a using the updated achieved prediction performance P. In general, an increase in the achieved prediction performance P results in a decrease in the improvement rate of each of the remaining machine learning algorithms. The updated improvement rate is calculated by replacing simply the value of P in fg(Xp, P)/t* used in the last improvement rate calculation. Note that there is no need to update the sample sizes of the individual machine learning algorithms registered in the schedule table 126.

[Step S22] The learning control unit 135 causes the runtime estimating unit 133 and the performance improvement amount estimating unit 134 to update functions of the machine learning algorithm a. The runtime estimating unit 133 calculates the function a.ft( ) by regression analysis using runtimes measured in the past, including the runtime t acquired in step S19. The performance improvement amount estimating unit 134 calculates the functions a.fp( ) and a.fXp( ) by regression analysis using prediction performance measured in the past, including the prediction performance p acquired in step S19. The updated functions a.fp( ), a.fXp( ) and a.ft( ) are registered in the function table 125.

[Step S23] By the above-described method, the learning control unit 135 calculates a sample size $s_{new}$ which maximizes the improvement rate of the machine learning algorithm a. The learning control unit 135 may make a trial improvement rate calculation by causing the runtime estimating unit 133 and the performance improvement amount estimating unit 134 to calculate, for each of some sample sizes, an estimated runtime and a performance improvement amount, respectively. In this regard, the functions a.fp( ), a.fXp( ), and a.ft( ) updated in step S22 are used. The sample size $s_{new}$ is a sample size s maximizing fg(fXp(s), P)/ft(s).

[Step S24] The learning control unit 135 compares the sample size $s_{new}$ and the size of the data set D stored in the data storing unit 121 to determine whether the sample size $s_{new}$ is larger than the size of the data set D. If the sample size $s_{new}$ is larger than the size of the data set D, the processing moves to step S25. If not, the processing moves to step S26.

[Step S25] The learning control unit 135 updates, within the schedule table 126, the improvement rate of the machine learning algorithm a to "0". Herewith, the execution of the machine learning algorithm a will be discontinued from this point forward. Subsequently, the processing moves to step S12.

[Step S26] The learning control unit 135 causes the runtime estimating unit 133 to estimate the runtime t of a learning step using the machine learning algorithm a with the sample size $s_{new}$. The process of the runtime estimating unit 133 is described later.

[Step S27] The learning control unit 135 causes the performance improvement amount estimating unit 134 to estimate the performance improvement amount g* of the learning step using the machine learning algorithm a with the sample size $s_{new}$. The process of the performance improvement amount estimating unit 134 is described later.

[Step S28] Based on the runtime t* estimated in step S26 and the performance improvement amount g* estimated in step S27, the learning control unit 135 calculates an improvement rate $r_{new}^*=g^*/t^*$ corresponding to the machine learning algorithm a and the sample size $s_{new}$.

[Step S29] The learning control unit 135 determines whether the length of time that has elapsed since the start of the machine learning has exceeded a time limit designated by the time limit input unit 131. If the elapsed time has exceeded the time limit, the processing moves to step S31. If not, the processing moves to step S30.

[Step S30] The learning control unit 135 saves a combination of <a, $s_{new}$, $r_{new}^*$> in the schedule table 126. That is, the learning control unit 135 updates, within the schedule table 126, the sample size corresponding to the machine learning algorithm a to $s_{new}$. In addition, the learning control unit 135 updates, within the schedule table 126, the improvement rate corresponding to the machine learning algorithm a to $r_{new}^*$. Subsequently, the processing moves to step S12.

[Step S31] The learning control unit 135 saves, in the learning result storing unit 123, the achieved prediction performance P and the model m having yielded the prediction performance. In addition, the learning control unit 135 saves, in the learning result storing unit 123, identification information of the machine learning algorithm associated with the achieved prediction performance P and the sample size associated with the achieved prediction performance P.

Figure 18:
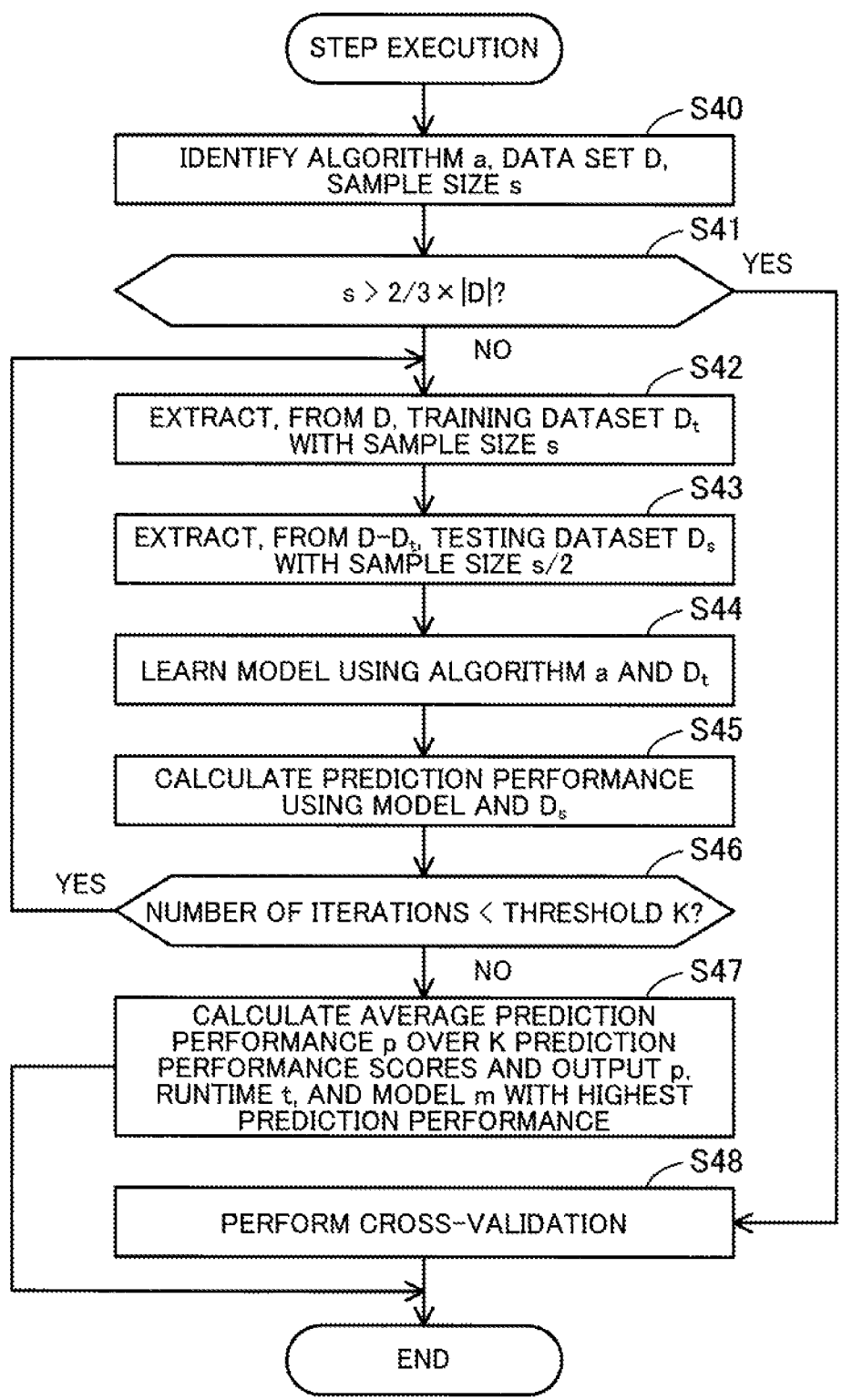
FIG. 18 is a flowchart illustrating an example of a step execution procedure.

FIG. 18 is a flowchart illustrating an example of a step execution procedure. Let us consider a case in which either random subsampling validation or cross-validation is employed as a validation technique according to the size of the data set D. Note however that the step executing unit 132 may use a different validation technique.

[Step S40] The step executing unit 132 identifies the machine learning algorithm a and the sampling size s designated by the learning control unit 135. In addition, the step execution unit 132 identifies the data set D stored in the data storing unit 121.

[Step S41] The step executing unit 132 determines whether the sample size s is larger than two-thirds the size of the data set D. If the sample size s is larger than $\frac{2}{3} \times |D|$, the step executing unit 132 selects cross-validation due to the insufficient amount of data. Subsequently, the processing moves to step S48. If the sample size s is less than or equal to $\frac{2}{3} \times |D|$, the step executing unit 132 selects random subsampling validation because the amount of data is sufficient. Subsequently, the processing moves to step S42.

[Step S42] The step executing unit 132 randomly extracts unit data elements to form a training dataset $D_t$ with the sample size s from the data set D. The extraction of the training data set $D_t$ is sampling without replacement. Therefore, the training dataset $D_t$ includes s unit data elements differing from each other.

[Step S43] The step executing unit 132 randomly extracts, from the data set D that does not include the training dataset $D_t$, unit data elements to form a testing dataset $D_s$ with a sample size being half the size of the sample size s. The extraction of the testing dataset $D_s$ is sampling without replacement. Therefore, the testing dataset $D_s$ includes s/2 unit data elements differing from those of the training dataset $D_t$ as well as from each other. The size ratio of the training dataset $D_t$ to the testing dataset $D_s$ is 2:1 here, however, the ratio may be changed.

[Step S44] The step executing unit 132 learns a model using the machine learning algorithm a and the training dataset $D_t$ extracted from the data set D.

[Step S45] The step executing unit 132 calculates the prediction performance of the learned model using the model and the testing dataset $D_s$ extracted from the data set D. Any index of the prediction performance may be used, such as accuracy, precision, and the RMSE. The index to be used may be set in advance in the step executing unit 132.

[Step S46] The step executing unit 132 compares the number of iterations of steps S42 to S45 and a threshold K and determines whether the number of iterations is less than the threshold K. The threshold K may be set in advance in the step executing unit 132. For example, the threshold K is 10. If the number of iterations is less than the threshold K, the processing moves to step S42. If not, the processing moves step S47.

[Step S47] The step executing unit 132 calculates average prediction performance over the K prediction performance scores calculated in step S45 and outputs it as the prediction performance p. In addition, the step executing unit 132 calculates and outputs the runtime t after the start of step S40 until the end of the iterations of steps S42 to S46. Further, the step executing unit 132 outputs, amongst the K models learned in step S44, a model m with the highest prediction performance. Then, the single learning step using random subsampling validation ends.

[Step S48] The step executing unit 132 performs the above-described cross-validation in place of the random subsampling validation above. For example, the step executing unit 132 randomly extracts unit data elements to be sample data elements with the sample size s from the data set D, and equally divides the extracted sample data elements into K blocks. The step executing unit 132 uses one block amongst the K blocks as a testing dataset and the remaining K−1 blocks as a training dataset, and repeats this K times, each time using a different block as the testing dataset. The step executing unit 132 outputs the average prediction performance p over the K prediction performance scores, the runtime t, and the model m with the highest prediction performance.

Figure 19:
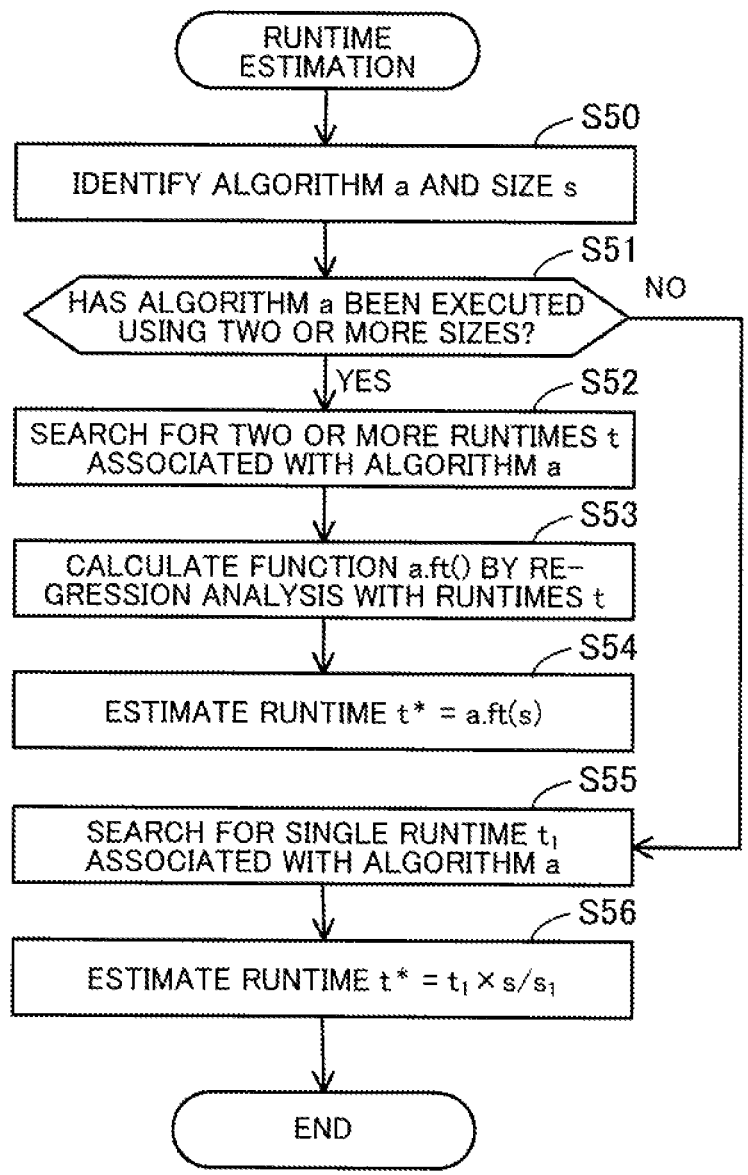
FIG. 19 is a flowchart illustrating an example of a runtime estimation procedure.

FIG. 19 is a flowchart illustrating an example of a runtime estimation procedure.

[Step S50] The runtime estimating unit 133 identifies a machine learning algorithm a and a sample size s designated by the learning control unit 135.

[Step S51] The runtime estimating unit 133 determines whether the machine learning algorithm a has been executed using two or more sample sizes. If the machine learning algorithm a has been executed using two or more sample sizes, the processing moves to step S52. If the machine learning algorithm a has been executed using only one sample size, the processing moves to step S55.

[Step S52] The runtime estimating unit 133 searches the history table 124 for two or more combinations of a sample size and a runtime t, associated with the machine learning algorithm a.

[Step S53] The runtime estimating unit 133 calculates the function a.ft( ) by regression analysis with the sample sizes being explanatory variable values and the runtimes t being target variable values. For example, the runtime estimating unit 133 determines coefficients $\alpha_2$ and $\beta_2$ in a.ft(s)=$\beta_2$+$\alpha_2$×s by linear regression analysis. Alternatively, the runtime estimating unit 133 may determine coefficients $\alpha_2$ and $\beta_2$ in a.ft(s)=$\beta_2$+$\alpha_2$×log(s) by linear regression analysis. The runtime estimating unit 133 updates the function a.ft( ) in the function table 125. Note however that the runtime estimating unit 133 may skip updating the function a.ft( ) if no history records associated with the machine learning algorithm a have been added since the last calculation of the function a.ft( ). In this case, the runtime estimating unit 133 is able to acquire the latest function a.ft( ) from the function table 125.

[Step S54] The runtime estimating unit 133 estimates the runtime t*=a.ft(s) associated with the machine learning algorithm a and the sample size s, using the function a.ft( ) calculated in step S53 and the sample size s identified in step S50. The runtime estimating unit 133 outputs the estimated runtime t*. Then, the runtime estimation ends.

[Step S55] The runtime estimating unit 133 searches the history table 124 for a single combination of a sample size and a runtime t, associated with the machine learning algorithm a.

[Step S56] The runtime estimating unit 133 estimates the runtime t*=$t_1$×s/$s_1$ associated with the machine learning algorithm a and the sample size s, where $s_1$ is the found sample size and $t_1$ is the found runtime. The runtime estimating unit 133 outputs the estimated runtime t*.

Figure 20:
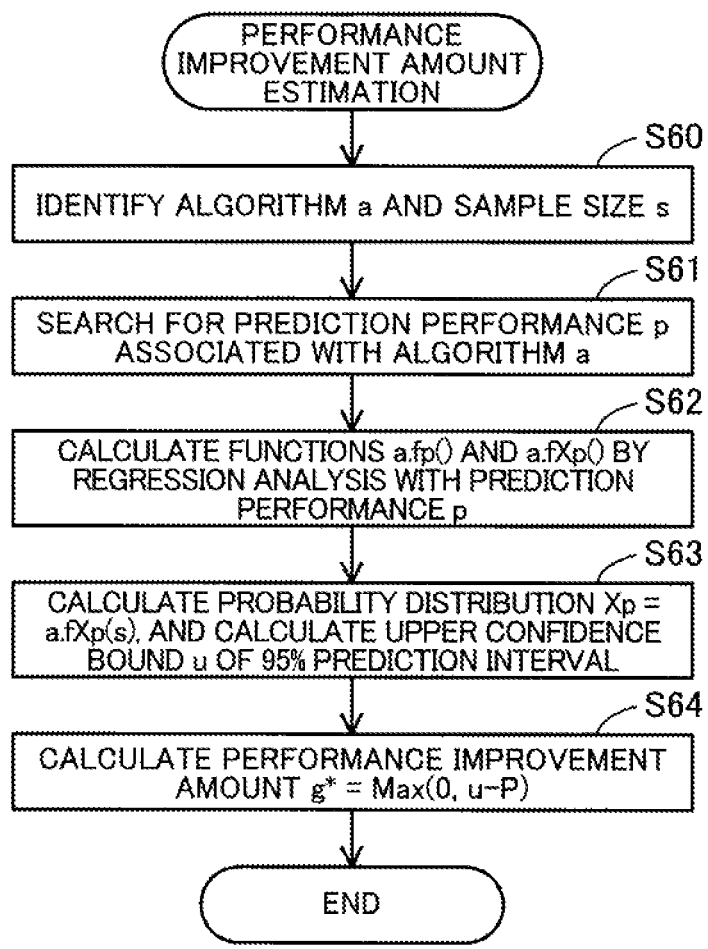
FIG. 20 is a flowchart illustrating an example of a performance improvement amount estimation procedure.

FIG. 20 is a flowchart illustrating an example of a performance improvement amount estimation procedure.

[Step S60] The performance improvement amount estimating unit 134 identifies a machine learning algorithm a and a sample size s designated by the learning control unit 135.

[Step S61] The performance improvement amount estimating unit 134 searches the history table 124 for one or more combinations of a sample size and prediction performance p associated with the machine learning algorithm a.

[Step S62] The performance improvement amount estimating unit 134 calculates the functions a.fp( ) and a.fXp( ) by regression analysis with the sample size being an explanatory variable and the prediction performance p being a target variable. For example, the performance improvement amount estimating unit 134 determines coefficients $\alpha_1$, $\beta_1$, and $\gamma$ in a.fp(s)=$\beta_1$−$\alpha_1$×$s^{-\gamma}$ by non-linear regression analysis. The function a.fXp( ) indicating the probability distribution of the prediction performance yielded with each sample size is obtained by regression analysis. Note however that a.fp( ) may be developed from a.fXp( ).

The performance improvement amount estimating unit 134 updates the functions a.fp( ) and a.fXp( ) of the function table 125. Note however that the performance improvement amount estimating unit 134 may skip updating the functions a.fp( ) and a.fXp( ) if no history records associated with the machine learning algorithm a have been added since the last calculation of the functions a.fp( ) and a.fXp( ). In this case, the performance improvement amount estimating unit 134 is able to acquire the latest functions a.fp( ) and a.fXp( ) from the function table 125.

[Step S63] The performance improvement amount estimating unit 134 calculates the probability distribution Xp=a.fXp(s) associated with the machine learning algorithm a and the sample size s, using the function a.fXp( ) calculated in step S62 and the sample size s identified in step S60. The performance improvement amount estimating unit 134 calculates an upper confidence bound u of the 95% prediction interval based on the probability distribution Xp associated with the sample size s. The upper confidence bound u may be referred to as the UCB or the 97.5% quantile. Note however that the performance improvement amount estimating unit 134 may calculate, in place of the UCB, the expected value of improvement (expected improvement, or EI) where the prediction performance will exceed the achieved prediction performance P by computing the integral of the probability distribution Xp, and use the calculated expected value as the upper confidence bound u.

[Step S64] The performance improvement amount estimating unit 134 compares the current achieved prediction performance P and the upper confidence bound u to thereby estimate the performance improvement amount g*=Max(0, u−P), and outputs the estimated performance improvement amount g*. The performance improvement amount g* is u−P when u>P and 0 when u≤P.

According to the machine learning device 100 of the second embodiment, with respect to each of a plurality of machine learning algorithms, a sample size to be used next is selected and the improvement rate for the sample size is estimated. Then, amongst the plurality of machine learning algorithms, one with the highest improvement rate is selected, and the selected machine learning algorithm is executed using a single sample size. This single learning step progresses at a time.

Herewith, machine learning algorithms making little contribution to improving the achieved prediction performance are no longer executed, which results in shortening the entire machine learning time. In addition, because a machine learning algorithm with the highest improvement rate is selected each time, even if the machine learning is terminated in the middle due to restrictions on the learning time, a model obtained by the finish time is the best model obtained within the time limit. Further, there is a possibility that machine learning algorithms making even a slight contribution to improving the achieved prediction performance are executed although they may be run later in the execution order. Therefore, it is possible to reduce the risk of cutting off machine learning algorithms with high upper limits on prediction performance when their sample sizes are small.

In addition, an increment in the sample size of each of a plurality of machine learning algorithms is not fixed but adjusted in consideration of the execution states of the currently-selected machine learning algorithm and other machine learning algorithms. That is, the sample size to be used next is selected based on the sample size maximizing the improvement rate of the prediction performance. This improves the rate of increase in the achieved prediction performance.

As for a machine learning algorithm for which a learning step with a large sample size is likely to be executed, a larger sample size is selected while small sample sizes are skipped. Therefore, it is possible to reduce fruitless intermediate learning steps taking place in the course of increasing the sample size. On the other hand, as for a machine learning algorithm for which a learning step with a large sample size is less likely to be executed, a smaller sample size is selected. Therefore, it is possible to improve the estimation accuracy of the prediction performance without using a large sample size, which allows the execution of machine learning algorithms with low upper limits on prediction performance to be discontinued at an earlier stage.

Thus, it is possible to promote the efficiency of machine learning using a plurality of machine learning algorithms and a plurality of sample sizes, which results in shortening the machine learning time.

According to one aspect, it is possible to improve the rate of increase in the model prediction performance in machine learning where a plurality of machine learning algorithms are repeatedly executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:
    identifying a maximum prediction performance score amongst a plurality of prediction performance scores corresponding to a plurality of models generated by executing each of a plurality of machine learning algorithms using a first training dataset size;
    estimating, for a first machine learning algorithm having generated a model corresponding to the maximum prediction performance score amongst the plurality of machine learning algorithms, based on an execution result obtained by executing the first machine learning algorithm using the first training dataset size, first estimated prediction performance scores corresponding to a plurality of second training dataset sizes and first estimated runtimes corresponding to the plurality of second training dataset sizes before executing the first machine learning algorithm using each of the plurality of second training dataset sizes, each of the plurality of second training dataset sizes being larger than the first training dataset size;
    determining, based on the maximum prediction performance score, the first estimated prediction performance scores, and the first estimated runtimes, a third training dataset size among the plurality of second training dataset sizes;
    estimating, for a second machine learning algorithm different from the first machine learning algorithm amongst the plurality of machine learning algorithms, based on an execution result obtained by executing the second machine learning algorithm using the first training dataset size, second estimated prediction performance scores corresponding to the plurality of second training dataset sizes and second estimated runtimes corresponding to the plurality of second training dataset sizes before executing the second machine learning algorithm using each of the plurality of second training dataset sizes;
    determining, based on the maximum prediction performance score, the second estimated prediction performance scores, and the second estimated runtimes, a fourth training dataset size among the plurality of second training dataset sizes;
    executing the first machine learning algorithm using the third training dataset size while skipping one or more second training dataset sizes between the first training dataset size and the third training dataset size; and
    executing the second machine learning algorithm using the fourth training dataset size while skipping one or more second training dataset sizes between the first training dataset size and the fourth training dataset size.

2. The non-transitory computer-readable storage medium according to claim 1, wherein:
    the determining the third training dataset size includes calculating, for each of the plurality of second training dataset sizes, based on the maximum prediction performance score, the first estimated prediction performance scores, and the first estimated runtimes, a first increase rate indicating an increment in the maximum prediction performance score per unit time, and determining the third training dataset size based on calculated first increase rates, and
    the determining the fourth training dataset size includes calculating, for each of the plurality of second training dataset sizes, based on the maximum prediction performance score, the second estimated prediction performance scores, and the second estimated runtimes, a second increase rate indicating an increment in the maximum prediction performance score per unit time, and determining the fourth training dataset size based on calculated second increase rates.

3. The non-transitory computer-readable storage medium according to claim 2, wherein:
the determining the third training dataset size includes setting, when a maximum first increase rate amongst the calculated first increase rates is higher than a maximum second increase rate amongst the calculated second increase rates, the third training dataset size larger than a training dataset size associated with the maximum first increase rate.

4. The non-transitory computer-readable storage medium according to claim 2, wherein:
the determining the fourth training dataset size includes setting, when the second estimated prediction performance scores and the second estimated runtimes satisfy a predetermined condition, the fourth training dataset size smaller than a training dataset size associated with a maximum second increase rate amongst the calculated second increase rates.

5. A machine learning management apparatus comprising:
a memory configured to store information on a plurality of prediction performance scores corresponding to a plurality of models generated by executing each of a plurality of machine learning algorithms using a first training dataset size; and
a processor configured to perform a procedure including:
identifying a maximum prediction performance score amongst the prediction performance scores,
estimating, for a first machine learning algorithm having generated a model corresponding to the maximum prediction performance score amongst the plurality of machine learning algorithms, based on an execution result obtained by executing the first machine learning algorithm using the first training dataset size, first estimated prediction performance scores corresponding to a plurality of second training dataset sizes and first estimated runtimes corresponding to the plurality of second training dataset sizes before executing the first machine learning algorithm using each of the plurality of second training dataset sizes, each of the plurality of second training dataset sizes being larger than the first training dataset size,
determining, based on the maximum prediction performance score, the first estimated prediction performance scores, and the first estimated runtimes, a third training dataset size among the plurality of second training dataset sizes,
estimating, for a second machine learning algorithm different from the first machine learning algorithm amongst the plurality of machine learning algorithms, based on an execution result obtained by executing the second machine learning algorithm using the first training dataset size, second estimated prediction performance scores corresponding to the plurality of second training dataset sizes and second estimated runtimes corresponding to the plurality of second training dataset sizes before executing the second machine learning algorithm using each of the plurality of second training dataset sizes,
determining, based on the maximum prediction performance score, the second estimated prediction performance scores, and the second estimated runtimes, a fourth training dataset size among the plurality of second training dataset sizes,
executing the first machine learning algorithm using the third training dataset size while skipping one or more second training dataset sizes between the first training dataset size and the third training dataset size, and
executing the second machine learning algorithm using the fourth training dataset size while skipping one or more second training dataset sizes between the first training dataset size and the fourth training dataset size.

6. A machine learning management method comprising:
identifying, by a processor, a maximum prediction performance score amongst a plurality of prediction performance scores corresponding to a plurality of models generated by executing each of a plurality of machine learning algorithms using a first training dataset size;
estimating, by the processor, for a first machine learning algorithm having generated a model corresponding to the maximum prediction performance score amongst the plurality of machine learning algorithms, based on an execution result obtained by executing the first machine learning algorithm using the first training dataset size, first estimated prediction performance scores corresponding to a plurality of second training dataset sizes and first estimated runtimes corresponding to the plurality of second training dataset sizes before executing the first machine learning algorithm using each of the plurality of second training dataset sizes, each of the plurality of second training dataset sizes being larger than the first training dataset size;
determining, by the processor, based on the maximum prediction performance score, the first estimated prediction performance scores, and the first estimated runtimes, a third training dataset size among the plurality of second training dataset sizes;
estimating, by the processor, for a second machine learning algorithm different from the first machine learning algorithm amongst the plurality of machine learning algorithms, based on an execution result obtained by executing the second machine learning algorithm using the first training dataset size, second estimated prediction performance scores corresponding to the plurality of second training dataset sizes and second estimated runtimes corresponding to the plurality of second training dataset sizes before executing the second machine learning algorithm using each of the plurality of second training dataset sizes;
determining, by the processor, based on the maximum prediction performance score, the second estimated prediction performance scores, and the second estimated runtimes, a fourth training dataset size among the plurality of second training dataset sizes;
executing, by the processor, the first machine learning algorithm using the third training dataset size while skipping one or more second training dataset sizes between the first training dataset size and the third training dataset size; and
executing, by the processor, the second machine learning algorithm using the fourth training dataset size while skipping one or more second training dataset sizes between the first training dataset size and the fourth training dataset size.

* * * * *